United States Patent
Ben-Shahar et al.

(10) Patent No.: US 11,085,823 B2
(45) Date of Patent: Aug. 10, 2021

(54) RECOVERY OF HYPERSPECTRAL DATA FROM IMAGE

(71) Applicant: B. G. NEGEV TECHNOLOGIES AND APPLICATIONS LTD., AT BEN-GURION UNIVERSITY, Beer Sheva (IL)

(72) Inventors: Ohad Ben-Shahar, Mishmar Hanegev (IL); Boaz Arad, Mazkeret Batya (IL)

(73) Assignee: B. G. NEGEV TECHNOLOGIES AND APPLICATIONS LTD., Beer Sheva (IL)

(*) Notice: Subject to any disclaimer, the term of this patent is extended or adjusted under 35 U.S.C. 154(b) by 218 days.

(21) Appl. No.: 16/330,832

(22) PCT Filed: Sep. 6, 2017

(86) PCT No.: PCT/IL2017/051002
§ 371 (c)(1),
(2) Date: Mar. 6, 2019

(87) PCT Pub. No.: WO2018/047171
PCT Pub. Date: Mar. 15, 2018

(65) Prior Publication Data
US 2019/0195690 A1 Jun. 27, 2019

Related U.S. Application Data

(60) Provisional application No. 62/518,038, filed on Jun. 12, 2017, provisional application No. 62/383,613, filed on Sep. 6, 2016.

(51) Int. Cl.
*G01J 3/28* (2006.01)
*G06T 7/90* (2017.01)
(Continued)

(52) U.S. Cl.
CPC ............... *G01J 3/2823* (2013.01); *G01J 3/28* (2013.01); *G06T 7/90* (2017.01);
(Continued)

(58) Field of Classification Search
CPC ............... G06T 7/90; G06T 7/62; G01J 3/28
See application file for complete search history.

(56) References Cited

U.S. PATENT DOCUMENTS

2016/0132748 A1 5/2016 Tillotson

FOREIGN PATENT DOCUMENTS

| CN | 103247034 B | 8/2013 | |
| CN | 104182978 * | 3/2014 | ............... G06K 9/00 |

(Continued)

OTHER PUBLICATIONS

Kim, Tacheon et al. "Nonspectroscopic imaging for quantitative chlorophyll sensing," Journal of biomedical optics, 2016, 21.1: pp. 016008-1-01600806.*

(Continued)

*Primary Examiner* — Myron Wyche
(74) *Attorney, Agent, or Firm* — The Roy Gross Law Firm, LLC; Roy Gross

(57) ABSTRACT

A method for approximating spectral data, the method comprising using at least one hardware processor for: providing a digital image comprising data in a first set of spectral bands; providing a dictionary comprising (a) signatures in a second set of spectral bands and (b) values in said first set of spectral bands, wherein said values correspond to the signatures, and wherein said first and second sets of spectral bands are different; and approximating, based on the dictionary, data in said second set of spectral bands of said digital image.

12 Claims, 20 Drawing Sheets

(51) Int. Cl.
  *G03B 33/16* (2006.01)
  *G06K 9/46* (2006.01)
  *H04N 9/04* (2006.01)
(52) U.S. Cl.
  CPC ....... *G01J 2003/2826* (2013.01); *G03B 33/16* (2013.01); *G06K 9/46* (2013.01); *G06K 2009/4657* (2013.01); *G06T 2207/10024* (2013.01); *H04N 9/045* (2013.01)

(56) References Cited

FOREIGN PATENT DOCUMENTS

| CN | 104063857 B | 6/2014 |
|---|---|---|
| WO | 2017066825 A1 | 4/2017 |

OTHER PUBLICATIONS

Lin, Xing et al.: "Spatial-spectral encoded compressive hyperspectral imaging", ACM Transactions on Graphics, ACM, NY, US, vol. 33, No. 6, Nov. 19, 2014 (Nov. 19, 2014).*
Jarecke, Peter J., et al.: Agregation of Hyperion hyperspectral spectral bands into Landst-7 ETM+ spectral bands, In: Proc. SPIE. 2002. p. 259-263.*
John B. Adams, Simple Models for Complex Natural Surfaces: A Strategy for the Hyperspectral Era of Remote Sensing, 6 pages, Department of Geological Sciences, University of Washington, Seattle, WA 98195.
Naveed Akhtar, Hyperspectral recovery from RGB images using Gaussian Processes, Ournal of Latex Class Files, 15 pages, vol. 14, No. 8, Aug. 2015.
Fernando Ayala, Use of three tristimulus values from surface reflectance spectra to calculate the principal components for reconstructing these spectra by using only three eigenvectors, 2020, 7 pages, J. Opt. Soc. Am. A/vol. 23, No. 8/Aug. 2006.
Boaz Arad, Sparse Recovery of Hyperspectral Signal from Natural RGB Images, 19 pages, Department of Computer Science, Ben-Gurion University of the Negev, Beersheba, Israel.
Seoung Wug Oh, Do It Yourself Hyperspectral Imaging with Everyday Digital Cameras, 9 pages, Yonsei University.
Xun Cao, High Resolution Multispectral Video Capture with a Hybrid Camera System, 8 pages, Tsinghua University, Microsoft Research Asia.
Jozef Cohen, Dependency of the spectral reflectance curves of the Munsell color chips, 2 pages, University of Illinois.Psychon. Sci., 1964, vol. 1.
Du Yong, A Subspace Matching Color Filter Design Methodology for a Multispectral Imaging System, 13 pages, Member, IEEE, and Jan P. Allebach, Fellow, IEEE; IEEE Transactions on Image Processing, vol. 15, No. 9, Sep. 2006.
Hu Dao, A Prism-based System for Multispectral Video Acquisition, 8 pages.
David William Flethcer-Holmes, Real-time imaging with a hyperspectral fovea, Institute of Physics Publishing; 6 pagesJ. Opt. A: Pure Appl. Opt. 7 (2005) S298-S302.
Mayank Goel, HyperCam: Hyperspectral Imaging for Ubiquitous Computing Applications, 12 pages, UBICOMP '15, Sep. 7-11, 2015, Osaka, Japan, Published May 9, 2005.
Hardberg, Jon Y., On the spectral dimensionality of object colours, Hardeberg, Jon Y.; 1 page, Conference on Colour in Graphics, Imaging, and Vision, CGIV 2002 Final Program and Proceedings, pp. 480-485(6).
Hardberg, Jon Y, Filter Selection for Multispectral Color Image Acquisition, 6 pages, Gjøvik University College Gjøvik, Norway; IS&T's 2003 PICS Conference.
Heikkinen, Evaluation and unification of some methods for estimating reflectance spectra from RGB images; 15 pages, J. Opt. Soc. Am. A / vol. 25, No. 10 / Oct. 2008.

Francisco H. Imai,Digital camera filter design for colorimetric and spectral accuracy; 4 pages ,Munsell Color Science Laboratory Rochester Institute of Technology, Rochester, NY, USA.
P Jarecke, Aggregation of Hyperion Hyperspectral Spectral Bands into Landsat-7 ETM+ Spectral Bands; 5 pages.
Jianchao Yang, Image Super-Resolution Via Sparse Representation, 13 pages, Student Member, IEEE, IEEE Transactions on Image Processing, vol. 19, No. 11, Nov. 2010.
Jun Jiang, What is the Space of Spectral Sensitivity Functions for Digital Color Cameras? 8 pages; Rochester Institute of Technology.
Rei Kawakami,High-resolution Hyperspectral Imaging via Matrix Factorization; 8 pages; The University of Tokyo.
Taehoon Kim, Nonspectroscopic imaging for quantitative chlorophyll sensing; 6 pages, Journal of Biomedical Optics 21(1), 016008 (Jan. 2016).
Hyeokhyen Kwon, Kaist, RGB-Guided Hyperspectral Image Upsampling, 2015 IEEE International Conference on Computer Vision; 9 pages.
Li Sui-Xian, Optimal sensitivity of multispectral camera based on PCA; 8 pages.
Bo Liu, Simulation of EO-1 Hyperion Data from ALI Multispectral Data Based on the Spectral Reconstruction Approach, Sensors 2009; 20 pages.
Miguel A. Lopez-Alvarez, Using a trichromatic CCD camera for spectral skylight estimation; 31 pages; accepted May 30, 2008; posted Jun. 27, 2008 (Doc. ID 95569); published Jul. 16, 2008.
Laurence T. Maloney, Evaluation of linear models of surface spectral reflectance with small numbers of parameters; 11 pages; vol. 3, No. IO/Oct. 1986/J. Opt. Soc. Am. A.
Michal Aharon, K-SVD: An Algorithm for Designing Overcomplete Dictionaries for Sparse Representation; 12 pages; IEEE Transactions on Signal Processing, vol. 54, No. 11, Nov. 2006.
Rang M. H. Nguyen, Training-Based Spectral Reconstruction from a Single RGB Image; 16 pages.
Seoung Wug Oh, Do It Yourself Hyperspectral Imaging with Everyday Digital Cameras; 2016 IEEE Conference on Computer Vision and Pattern Recognition; 9 pages.
Jong-Il Park, Multispectral Imaging Using Multiplexed Illumination; 8 pages.
J.P.S. Parkkinen, Characteristic spectra of Munsell colors; 5 pages; J. Opt. Soc. Am. A/vol. 6, No. 2/Feb. 1989.
Manu Parmar; Spatio-Spectral Reconstruction of the Multispectral Datacube Using Sparse Recovery; 4 pages.
Y.C. Pati, Orthogonal Matching Pursuit: Recursive Function Approximation with Applications to Wavelet Decomposition; 5 pages; To appear in Proc. of the 27th Annual Asilomar Conference on Signals Systems and Computers, Nov. 1-3, 1993.
Shuxue Quan, Optimization of Camera Spectral Sensitivities; S&T/SID Eighth Color Imaging Conference; 7 pages; Copyright 2000, IS&T.
Tsuyoshi Takatani, One-shot Hyperspectral Imaging using Faced Reflectors; 9 pages.
Tao Wang, A Smart Sensor with Hyperspectral/Range Fovea and Panoramic Peripheral View, 8 pages.
Radu Timofte, Anchored Neighborhood Regression for Fast Example-Based Super-Resolution; 2013 IEEE International Conference on Computer Vision; 8 pages.
Poori L. Vora, Measure of goodness of a set of color-scanning filters; 10 pages, vol. 10, No. 7/Jul. 1993/J. Opt. Soc. Am. A.
Ying Wu, A Study on Spectral Super-resolution of Hyperspectral Imagery based on Redundant Dictionary; 5 pages; Information Engineering (IE) vol. 3, 2014.
Xing Lin, Spatial spectral Encoded Compressive Hyperspectral Imaging; Deparrment of Auromation, Tsinghua University Beijing Key Laboratory of Multi-dimension & Multi-scale Computational Photography (MMCP), Tsinghua University; 11 pages.
Xing Zhengming, Dictionary Learning for Noisy and Incomplete Hyperspectral Image; 33 pages; Siam J. Imaging Sciences; 2012 Society for Industrial and Applied Mathematics; vol. 5, No. 1, pp. 33-56.
PCT Search Report International Application No. PCT/IL2017/051002, dated Feb. 12, 2018, 6 pages.

(56) References Cited

OTHER PUBLICATIONS

PCT Written Opinion International Application No. PCT/IL2017/051002, dated Feb. 12, 2018, 9 pages.
PCT Preliminary Report International Application No. PCT/IL2017/051002, dated Sep. 6, 2017, 10 pages.

* cited by examiner

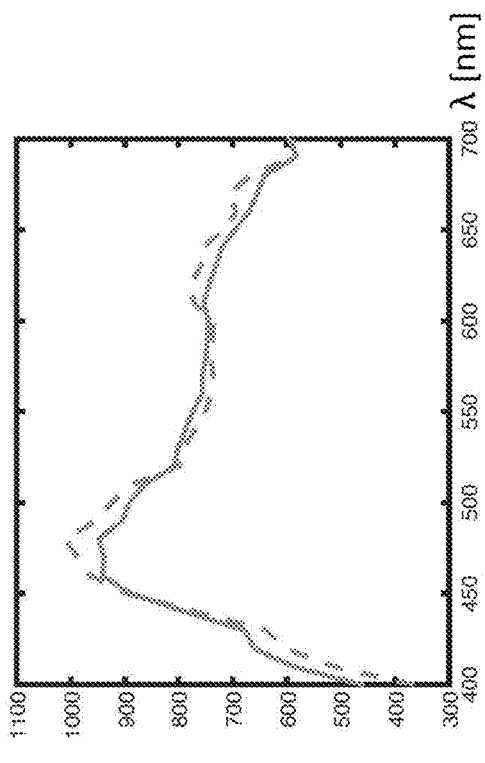
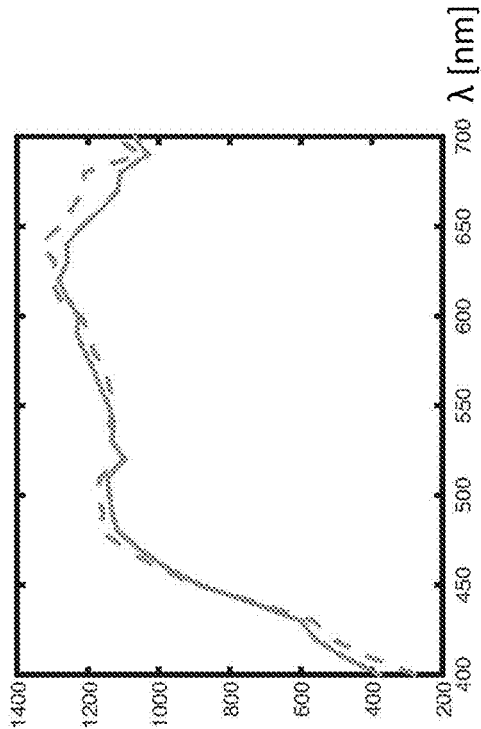
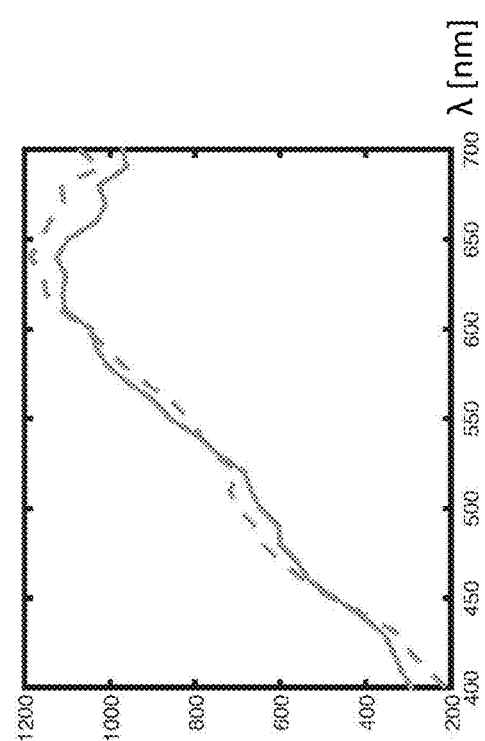
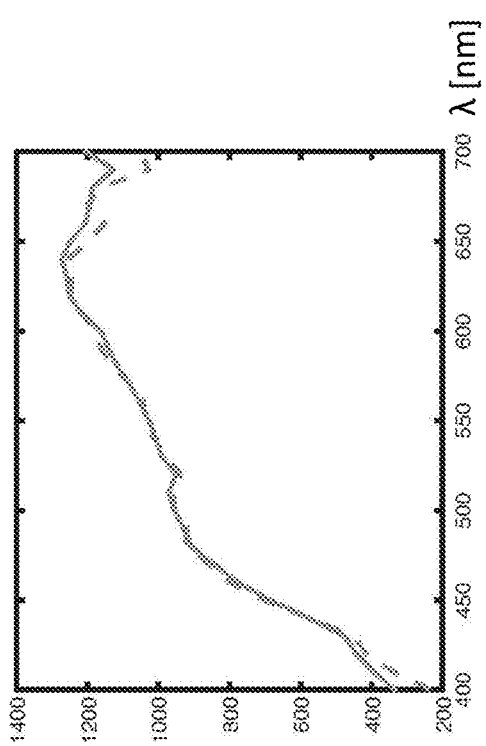
Fig. 3A
Fig. 3B
Fig. 3C
Fig. 3D

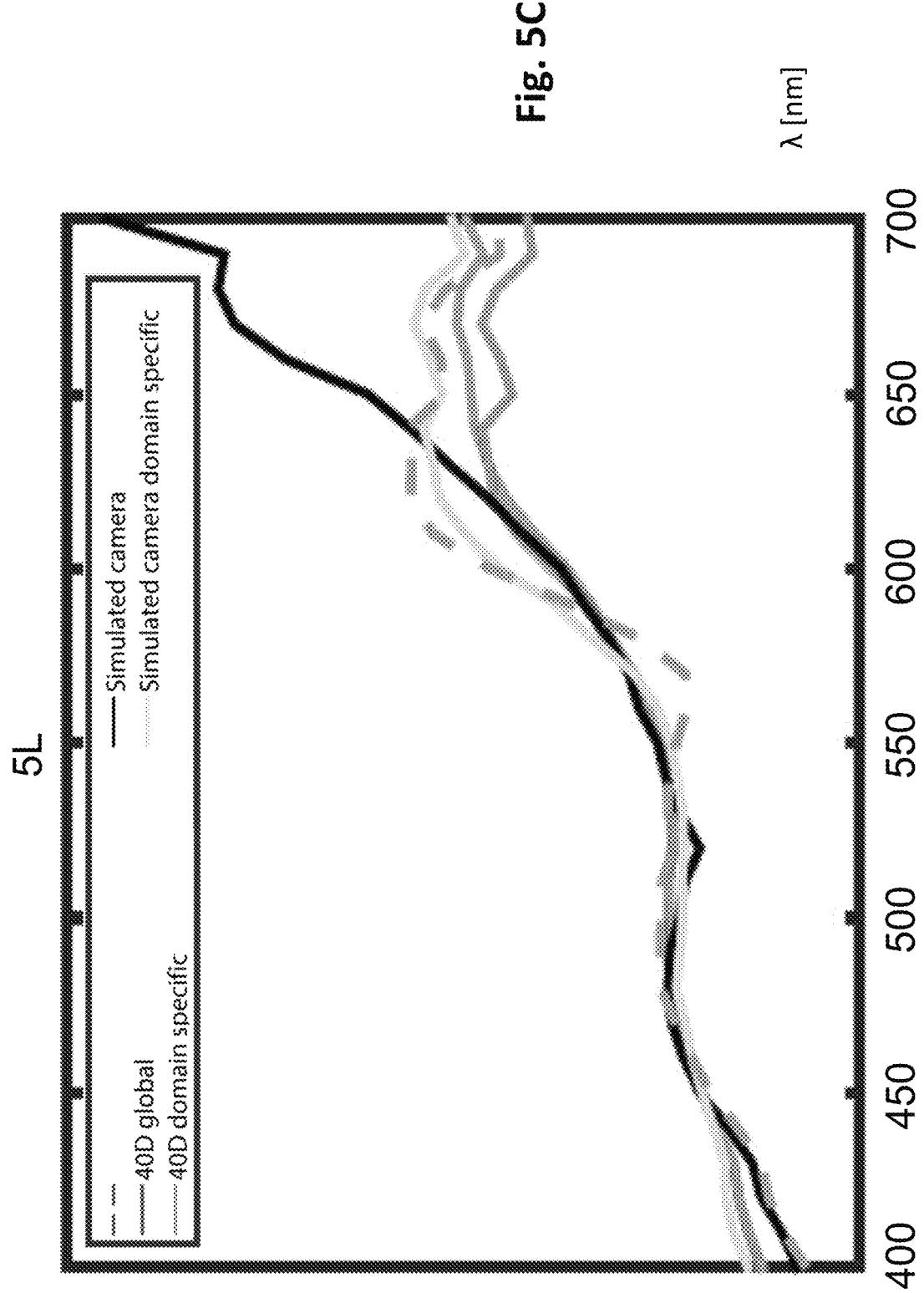

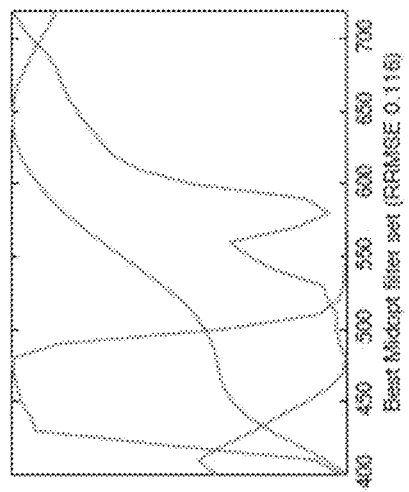
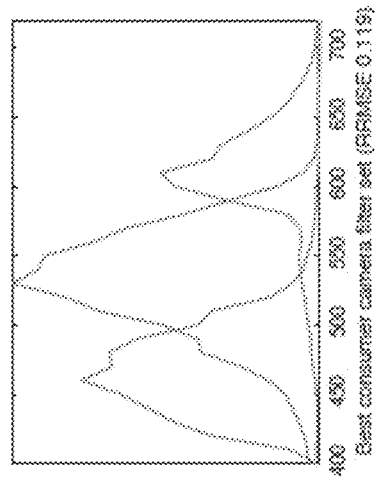
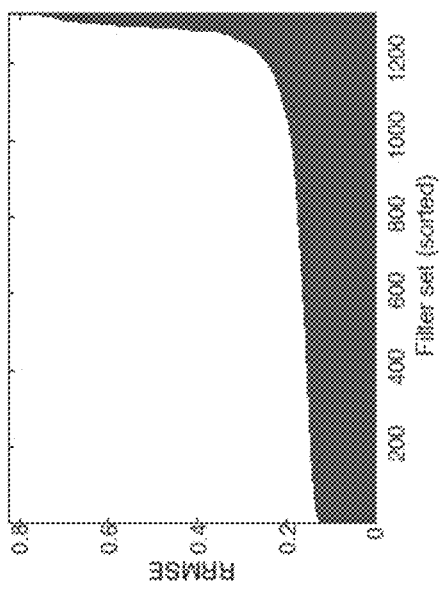
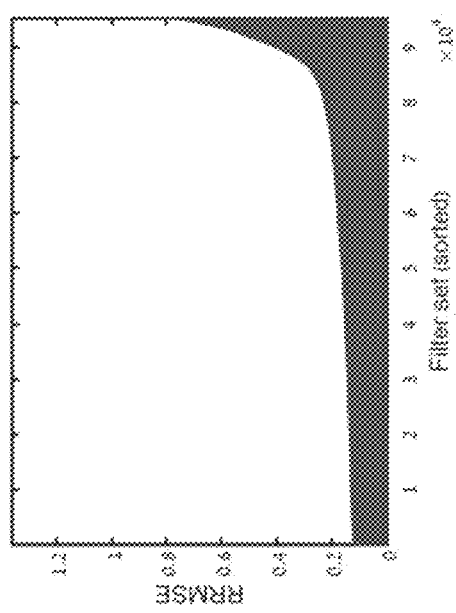
Fig. 11A
Fig. 11B
Fig. 11C
Fig. 11D

RECOVERY OF HYPERSPECTRAL DATA FROM IMAGE

CROSS-REFERENCE TO RELATED APPLICATIONS

This application is a National Phase of PCT Patent Application No. PCT/IL2017/051002 having International filing date of Sep. 6, 2017 titled RECOVERY OF HYPERSPECTRAL DATA FROM IMAGE, which claims the benefit of priority of U.S. Provisional Patent Application Nos. 62/383,613, filed Sep. 6, 2016, and 62/518,038, filed Jun. 12, 2017. The contents of the above applications are all incorporated by reference as if fully set forth herein in their entirety.

FIELD OF THE INVENTION

The invention relates to the field of photography and, particularly, hyperspectral imaging.

BACKGROUND

Hyperspectral imaging has been an active area of research since modern acquisition technology became available in the late 1970s. Unlike RGB (Red-Green-Blue) or multispectral acquisition devices, the goal of hyperspectral imaging is the acquisition of a complete spectral signature reflected from each observable point.

The richness of this information facilitates numerous applications, but it also comes at a price: a significant decrease in spatial or temporal resolution. As a result, the use of HISs (Hyperspectral Imaging Systems) has been limited to those domains and applications in which these aspects of the signal (either spatial, but mostly temporal resolution) were not central, such as remote sensing, agriculture, geology, astronomy, earth sciences, and others. Even in these cases, the HIS is often used for the preliminary analysis of observable signals in order to characterize the parts of the spectrum that carry valuable information for the application. This information is then used to design multispectral devices (cameras with a few spectral bands) that are optimized for that application.

Unlike their use in niche or dedicated applications such as the above, the use of HISs in general computer vision, and particularly in the analysis of natural images, is still in its infancy. The main obstacles are not only the spatial, spectral, and/or temporal resolution while acquiring a hyperspectral image "cube," but also the cost of the hyperspectral devices that acquire them, and their physical size (weight and volume), both being excessive and presenting a severe limitation for most possible applications.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided a method for approximating spectral data, the method comprising using at least one hardware processor for: providing a digital image comprising data in a first set of spectral bands; providing a dictionary comprising (a) signatures in a second set of spectral bands and (b) values in said first set of spectral bands, wherein said values correspond to the signatures, and wherein said first and second sets of spectral bands are different; and approximating, based on the dictionary, data in said second set of spectral bands of said digital image.

There is further provided, in accordance with an embodiment, an apparatus comprising: an image sensor configured to capture a digital image in a first set of spectral bands; a non-transient memory having stored thereon a dictionary comprising (a) signatures in a second set of spectral bands and (b) values in said first set of spectral bands, wherein said values correspond to the signatures, and wherein said first and second sets of spectral bands are different; and at least one hardware processor configured to approximate, based on said dictionary, data in said second set of spectral bands of said digital image.

There is yet further provided, in accordance with an embodiment, a computer program product for approximating spectral data, the computer program product comprising a non-transitory computer-readable storage medium having program code embodied therewith, the program code executable by at least one hardware processor to: receive a digital image comprising data in a first set of spectral bands; receive a dictionary comprising (a) signatures in a second set of spectral bands and (b) values in said first set of spectral bands, wherein said values correspond to the signatures, and wherein said first and second sets of spectral bands are different; and approximate, based on the dictionary, data in said second set of spectral bands of said digital image.

In some embodiments, said first set of spectral bands is Red-Green-Blue (RGB).

In some embodiments, said second set of spectral bands is between 400 and 800 nanometers.

In some embodiments, each band of said first second set of spectral bands has a width of 5 to 100 nanometers.

In some embodiments, each band of said second set of spectral bands has a width of 5 to 100 nanometers.

In some embodiments, the dictionary comprises an overcomplete dictionary.

In some embodiments, the method further comprises constructing the dictionary based on a set of representative multi spectral images each comprising data in said multiple spectral bands and in said other multiple spectral bands.

In some embodiments, the program code is further executable by said at least one hardware processor to construct the dictionary based on a set of representative multi spectral images each comprising data in said multiple spectral bands and in said other multiple spectral bands.

There is also provided a method for selecting a color filter array for a digital camera, said color filter array comprising a desired number of color filters, the method comprising: providing a color filter set comprising a plurality of color filters having a corresponding plurality of spectral frequency responses; providing one or more criteria for evaluating said color filter array; using at least one hardware processor for performing the following iterative steps: (i) determining a test group comprising a plurality of test filter arrays randomly-selected from said color filter set, each of said plurality of test filter arrays comprising said desired number of color filters, (ii) evaluating each of said plurality of test filter arrays based on said one or more criteria, (iii) assigning an evaluation parameter to each of said plurality of test filter arrays based on said evaluating, and (iv) in a next iteration, including in the test group: (a) a first proportion of previously-evaluated test filter arrays selected based on said evaluation parameter, (b) a second proportion of test filter arrays constructed by combining color filters randomly-selected from two previously-evaluated test filter arrays selected based on said evaluation parameter, and (c) a third proportion of previously-evaluated test filter arrays, wherein one of the color filters in each of said test filter arrays is replaced with a randomly-selected color filter from said color filter set; repeating said iterative steps until an optimal color filter array is found based on said evaluation parameter; and implementing said optimal color filter array as a color filter array for a digital camera.

There is further provided a computer program product for selecting a color filter array for a digital camera, said color filter array comprising a desired number of color filters, the computer program product comprising a non-transitory computer-readable storage medium having program code embodied therewith, the program code executable by at least one hardware processor to: provide a color filter set comprising a plurality of color filters having a corresponding plurality of spectral frequency responses; provide one or more criteria for evaluating said color filter array; perform the following iterative steps: (i) determine a test group comprising a plurality of test filter arrays randomly-selected from said color filter set, each of said plurality of test filter arrays comprising said desired number of color filters, (ii) evaluate each of said plurality of test filter arrays based on said one or more criteria, (iii) assign an evaluation parameter to each of said plurality of test filter arrays based on said evaluating, and (iv) in a next iteration, include in the test group (a) a first proportion of previously-evaluated test filter arrays selected based on said evaluation parameter, (b) a second proportion of test filter arrays constructed by combining color filters randomly-selected from two previously-evaluated test filter arrays selected based on said evaluation parameter, and (c) a third proportion of previously-evaluated test filter arrays, wherein one of the color filters in each of said test filter arrays is replaced with a randomly-selected color filter from said color filter set; repeat said iterative steps until an optimal color filter array is found based on said evaluation parameter; and implement said optimal color filter array as a color filter array for a digital camera.

In some embodiments, said one or more criteria are selected from the group comprising: quantum efficiency, exposure uniformity, and spectral approximation accuracy.

In some embodiments, said one or more criteria is spectral approximation accuracy, and the step of evaluating each of said plurality of test filter arrays comprises: providing a first digital image comprising data in a first set of spectral bands; projecting said digital image through said optimal color filter array to obtain a second digital image comprising data in a second set of spectral bands; providing a dictionary comprising signatures in said first set of spectral bands and corresponding values in said second set of spectral bands; approximating, based on the dictionary, data in said first set of spectral bands of said second digital image; and comparing (a) said data in first set of spectral band of said first digital image with (b) said data in said second set of spectral band of said second digital image, to arrive at said evaluation parameter.

In some embodiments, said evaluation parameter is represented as relative root mean square error (RRMSE). In some embodiments, said desired number of color filters is at least 3. In some embodiments, the color filter set comprises between 700 and 1500 color filters.

In some embodiments, said first proportion is equal to 10% of the test group, said second proportion is equal to 40% of the test group, and said third proportion is equal to 10% of the test group.

There is further provided an apparatus comprising: an image sensor configured to capture a digital image; a filter array operatively coupled to said image sensor, said filter array comprising a desired number of color filters, wherein the composition of said filter array is determined by a process comprising the following steps: providing a color filter set comprising a plurality of color filters having a corresponding plurality of spectral frequency responses; providing one or more criteria for evaluating said color filter array; using at least one hardware processor for performing the following iterative steps: (i) determining a test group comprising a plurality of test filter arrays randomly-selected from said color filter set, each of said plurality of test filter arrays comprising said desired number of color filters, (ii) evaluating each of said plurality of test filter arrays based on said one or more criteria, (iii) assigning an evaluation parameter to each of said plurality of test filter arrays based on said evaluating, and (iv) in a next iteration, including in the test group (a) a first proportion of previously-evaluated test filter arrays selected based on said evaluation parameter, (b) a second proportion of test filter arrays constructed by combining color filters randomly-selected from two previously-evaluated test filter arrays selected based on said evaluation parameter, and (c) a third proportion of previously-evaluated test filter arrays, wherein one of the color filters in each of said test filter arrays is replaced with a randomly-selected color filter from said color filter set; repeating said iterative steps until an optimal color filter array is found based on said evaluation parameter; and implementing said optimal color filter array as a color filter array for a digital camera.

In some embodiments, said image sensor is a charged-couple device (CCD) image sensor. In some embodiments, said image sensor is a complementary metal-oxide semiconductor (CMOS) image sensor. In some embodiments, the apparatus further comprises two or more said image sensors. In some embodiments, the apparatus further comprises a beam-splitter configured to direct light to said two or more said image sensors. In some embodiments, the apparatus further comprises two or more said filter arrays.

In some embodiments, said desired number of color filters is at least 3.

In some embodiments, said apparatus is configured for capturing images in a desired set of spectral bands.

In some embodiments, the apparatus further comprises at least one hardware processor configured for approximating hyperspectral data from images captured by said apparatus. In some embodiments, said at least one hardware processor is further configured to simulate data in a desired set of spectral bands from said hyperspectral data. In some embodiments, said desired set of spectral bands comprises red-green-blue (RGB) spectral bands. In some embodiments, said hyperspectral data is used for performing illumination estimation and correction on images captured by said apparatus.

In some embodiments, said hyperspectral data is used for applying relighting to images captured by said apparatus. In some embodiments, said hyperspectral data is used for generating spectral high-dynamic-range imaging from images captured by said apparatus. In some embodiments, said hyperspectral data is used for material identification. In some embodiments, said hyperspectral data is used for object recognition, including facial recognition.

In some embodiments, said one or more criteria are selected from the group comprising: quantum efficiency, exposure uniformity, and spectral approximation accuracy.

In some embodiments, said first proportion is equal to 10% of the test group, said second proportion is equal to 40% of the test group, and said third proportion is equal to 10% of the test group.

The is further provided a method for simulating spectral data, the method comprising using at least one hardware processor for: receiving a digital image comprising hyperspectral data; and generating an image in a desired set of spectral bands, by applying to said hyperspectral data one or more spectral response functions corresponding to said desired set of spectral bands. There is also provided a computer program product for simulating spectral data, the computer program product comprising a non-transitory computer-readable storage medium having program code embodied therewith, the program code executable by at least one hardware processor to: receive a digital image comprising hyperspectral data; and generate an image in a desired set of spectral bands, by applying to said hyperspectral data one or more spectral response functions corresponding to said desired set of spectral bands.

In some embodiments, said hyperspectral data comprises data in spectral bands having wavelengths of between 400 and 800 nanometers. In some embodiments, said desired set of spectral bands is red-green-blue (RGB). In some embodiments, each band of said desired set of spectral bands has a width of 5 to 100 nanometers.

In some embodiments, the step for receiving said digital image comprising hyperspectral data further comprises approximating said hyperspectral data from values in a limited set of spectral bands.

In some embodiments, said approximating of said hyperspectral data comprises: providing a digital image comprising data in a first set of spectral bands; providing a dictionary comprising (a) signatures in a second set of spectral bands and (b) values in said first set of spectral bands, wherein said values correspond to the signatures, and wherein said first and second sets of spectral bands are different; and approximating, based on the dictionary, data in said second set of spectral bands of said digital image.

In some embodiments, said second set of spectral bands is between 400 and 800 nanometers. In some embodiments, said dictionary comprises an overcomplete dictionary. In some embodiments, the method further comprises constructing the dictionary based on a set of representative multi-spectral images each comprising data in said first set of spectral bands and in said second set of spectral bands.

In some embodiments, the step for receiving said digital image comprising said hyperspectral data comprises: providing a digital image comprising data in a first set of spectral bands; providing a lookup table comprising hyperspectral values corresponding to said data in said first set of spectral bands; and generating an image comprising hyperspectral data based on said lookup table. In some embodiments, said lookup table further incorporates a machine learning algorithm.

In some embodiments, the step for generating an image in a desired set of spectral bands comprises using at least one hardware processor for: providing a digital image comprising data in a first set of spectral bands; providing a lookup table comprising values in said desired set of spectral bands corresponding to said data is said first set of spectral bands, wherein said first and desired sets of spectral bands are different; and generating, based on said lookup table, an image in said desired set of spectral bands. In some embodiments, said lookup table further incorporates a machine learning algorithm.

In addition to the exemplary aspects and embodiments described above, further aspects and embodiments will become apparent by reference to the figures and by study of the following detailed description.

BRIEF DESCRIPTION OF THE DRAWINGS

Exemplary embodiments are illustrated in referenced figures. Dimensions of components and features shown in the figures are generally chosen for convenience and clarity of presentation and are not necessarily shown to scale. The figures are listed below.

FIGS. 3A-3D show graphs of random samples of reconstructed spectra (dashed) and ground truth data (solid), in accordance with an embodiment;

FIGS. 5A-5C show graphs of samples of reconstructed spectra (dashed) and ground truth (solid) for consumer RGB camera input, in accordance with an embodiment;

FIGS. 11A-11D show experimental results of testing of a method for selecting a color filter array for a digital camera, in accordance with an embodiment;

DETAILED DESCRIPTION

Figure 1:
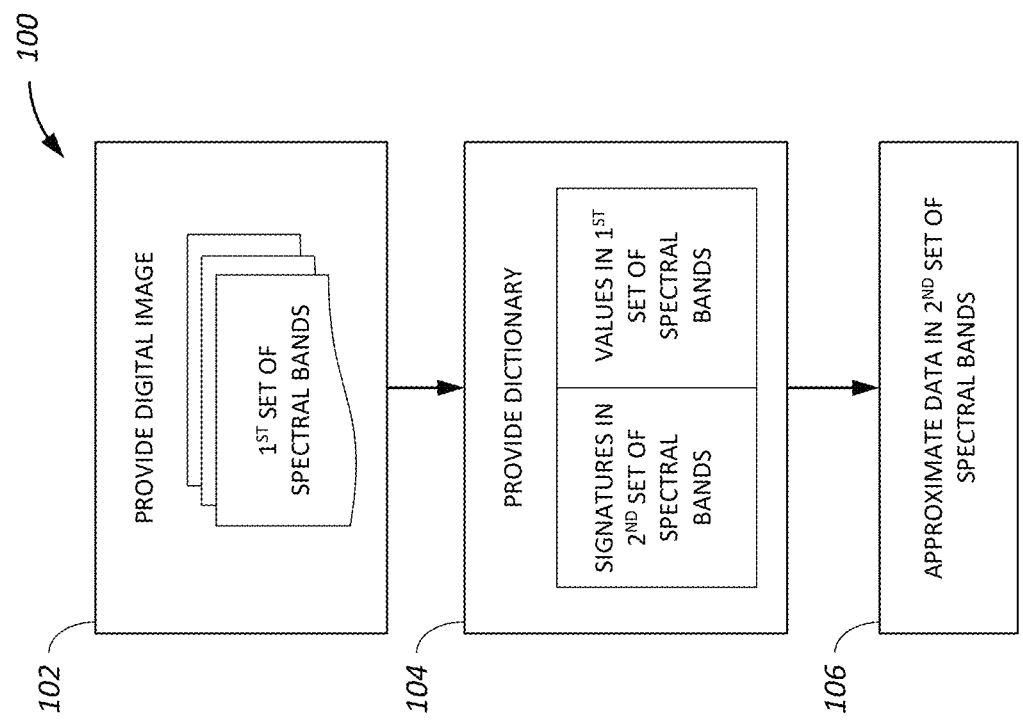
FIG. 1 shows a flow chart of a method for approximating spectral data, in accordance with an embodiment.

There is disclosed a method for the recovery of hyperspectral (HS) data from an RGB image.

Also disclosed are a method for selection of an optimized color filter array (CFA) for increased photon efficiency and for improved recovery of HS data from an RGB image; and a camera system incorporating said optimized CFA.

Further disclosed is a method for generating a full color image from the output of said optimized CFA.

A camera system according to some embodiments includes non-rgb filters designed for increased quantum efficiency which produces RGB images via hyperspectral reconstruction and projection back to RGB. The reconstruction process can either happen in-camera, or be pre-computed, e.g., as a lookup table.

Glossary

Spectral band as used herein means a range or a band of wavelengths in the electromagnetic spectrum. For example, a digital color image may contain data in three spectral bands—red, green and blue.

Set of spectral bands as used herein means two or more discrete spectral bands. These discrete spectral bands may be immediately next to one another in the electromagnetic spectrum, partially overlap, or be farther apart from each other. An example of a set of spectral bands is the information contained in an RGB digital image, which, as mentioned above, includes data in three spectral bands—red, green and blue.

Multispectral as used herein means a digital image or a digital signal composed of data in multiple spectral bands.

Hyperspectral as used herein means a multi spectral digital image or signal composed of a relatively large number of spectral bands. Such a digital image or signal contains information from across a relatively large range in the electromagnetic spectrum. Such range may contain spectral bands within the visible spectrum, or, in some cases, may extend beyond the visible spectrum. For example, a hyperspectral digital image or signal may include spectral bands in the visible, ultraviolet and infrared wavelength ranges.

Scene as used herein may be synonymous with the term "domain" and may relate to a scene captured on a tangible medium using an imaging device.

Natural scene as used herein relates to an image scene comprising any ground-level indoors, outdoors, cityscape, countryside, landscape, landforms, terrain, wildlife, vegetation, and similar views.

Quantum efficiency or photon efficiency of an image sensor is defined as the percentage of photons hitting the device's photo-reactive surface that produce charge carriers. An image sensor with a high photo efficiency is more sensitive to light. In image sensor design, increasing photon efficiency is beneficial, as it increases the sensors capability to function in low-light conditions.

Data, information, and values mean digital data which may be stored on a volatile (transient) or non-volatile (non-transient) memory device, and may be processed by at least one hardware processor in accordance with program instructions.

Dictionary as used herein refers to a representation of input data, such as signals or images, where the input data are decomposed to a series of dictionary entries.

Overcomplete dictionary refers to a dictionary where the number of dictionary elements is greater than the dimensionality of the signals/images.

Recovery of Hyperspectral Data from RGB Images

Approximation of spectral data in a digital image is disclosed herein. Advantageously, the approximation yields a digital image richer than the one originally acquired; that is, the richer digital image contains spectral data not included in the originally-acquired digital image. For example, a digital image composed of a first set of spectral bands (for instance, Red-Green-Blue or RGB bands) may be enriched with additional spectral bands which were not included in original image as taken.

The approximation is based on a finding that, at least in certain ranges of the electromagnetic spectrum, spectral data (or spectral values) in one set of spectral bands may be indicative, with sufficient reliability, of spectral data in another set of spectral bands. A threshold which defines this sufficient reliability may be dictated by a user, for example on a case-by-case basis. The above finding enables the construction of a dictionary which translates spectral data in one set to the other set. Such a dictionary has been experimentally constructed for natural scenes, based on a provided library of hyperspectral images which include, in each image, spectral data of such a wide wavelength range which is sufficient for separation into two (or more) different sets of spectral bands. These hyperspectral images have been acquired by sophisticated, costly HISs. However, the HISs are needed only once, for the construction of the dictionary, and are not required for acquiring any new images and approximating new spectral data in these images.

Similar to the creation of the aforementioned dictionary, a general method for constructing a dictionary for different uses (for example, for use in scenes other than natural scenes) is provided herein.

Since today's state-of-the-art hyperspectral systems still require special acquisition hardware and/or complex and costly computations for each frame acquired, the advantageous nature of the present approximation is clear. In the approach presented herein, the acquisition system requires only RGB and no hyperspectral input (and therefore no hyperspectral equipment) whatsoever, and has the bulk of the necessary computations done only once prior to many subsequent acquisitions.

Hyperspectral imaging is an important visual modality with a growing interest and a range of applications. This type of imaging, however, is severely restricted by the fact that many existing devices are limited in either spatial, spectral, and/or temporal resolution, while still being both complicated and expensive. The present method, in contrast, offers a low cost and fast alternative, in which spectral data, for example hyperspectral data, is approximated instead of actually acquired.

Reference is now made to FIG. 1, which shows a flow chart of a method 100 for approximating spectral data, in accordance with some embodiments. Method 100 includes, in a step 102, providing as input a digital image having data in a first set of spectral bands. As a further input, a dictionary is provided in a step 104, including signatures in a second set of spectral bands as well as values in the first set of spectral bands, wherein the values correspond to the signatures. In some variations, the first set and the second set are different. In other variations, the second set may partially overlap with the first set. For example, the first set may be RGB, and the second set may comprise other spectral bands in the visible range of the electromagnetic spectrum.

Then, based on the dictionary, data in the second set is approximated in a step 106. Finally, in some embodiments, a richer digital image is constructed, which image including both the first and second sets of spectral data. Namely, the richer image may be hyperspectral albeit having merely a narrower spectral image as input, as well as a dictionary.

Back to the RGB example, the present approach may first leverage prior hyperspectral information in order to create the dictionary for the observable hyperspectral signatures and their corresponding RGB projections. In this example, the present approach may be fast, accurate, and provide state-of-the-art high resolution hyperspectral cubes despite using RGB-only input.

Key to the present disclosure is the exploitation of prior information on the distribution of hyperspectral signatures in images of a specifically-characterized type of scenery. For simplicity of presentation, the present discussions utilize an example of natural images. However, those of skill in the art will recognize that the present method may as well be applicable to prior information on the distribution of hyperspectral signatures in other types of scenes, such as aerial photography of urban areas, aerial photography of agricultural areas, industrial photography of various produce, product photos, medical imaging, etc.

In some embodiments, the prior information is sampled from the real world by acquiring a range of hyperspectral images using a genuine HIS, but this process may be done only once for each type of scenery. Naturally, one can use existing collections of ground-level hyperspectral images, but unfortunately only a limited amount of such data sets has been published to date; notable examples include those published by G. Brelstaff, A. P'arraga, T. Troscianko, and D. Carr, *Hyperspectral camera system: acquisition and analysis*, In Proceedings of SPIE, volume 2587, pages 150-159, Citeseer, 1995, 2 (29 images of rural scenes/plant life); by D. Foster, K. Amano, S. Nascimento, and M. Foster, *Frequency of metamerism in natural scenes*, JOSA A, 23(10):2359-2372, 2006, 2, 3 (16 urban/rural scenes); by F. Yasuma, T. Mitsunaga, D. Iso, and S. Nayar, *Generalized Assorted Pixel Camera: Post-Capture Control of Resolution, Dynamic Range and Spectrum*, Technical report, November 2008. 2, 5 (32 studio images of various objects); and more recently, by A. Chakrabarti and T. Zickler, *Statistics of Real-World Hyperspectral Images*, In Proc. IEEE Conf. on Computer Vision and Pattern Recognition (CVPR), pages 193-200, 2011, 2 (50 mostly urban outdoor scenes and 27 indoor scenes).

Since collecting hyperspectral image datasets may be laborious, most of the above databases may be limited in scope (if nothing else, then by the mere number of scenes imaged). At the same time, some of the available data may also lack spatial resolution (for example, the images in the Brelstaff data set are 256×256 pixels in size) and all may have spectral resolution of 33 channels or fewer. To allow better collection of hyperspectral prior, and to provide better tools to advance natural hyperspectral imagery research in general, there are provided new and larger hyperspectral database of natural images captured at high spatial and spectral resolution.

In some embodiments, the goal is the reconstruction of a hyperspectral image of a natural scene from a RGB image thereof. On its face, this is a difficult task. Spectral signatures, even in compact subsets of the spectrum, are very high (and in the theoretical continuum, infinite) dimensional objects, while RGB signals are three dimensional. The back-projection from RGB to hyperspectral is thus severely underconstrained, and reversal of the many-to-one mapping performed by the eye or the RGB camera may seem rather unlikely.

However, the present method may be able to obtain reliable approximations of hyperspectral signals from RGB data only, and, in other embodiments, to obtain reliable approximation of a certain first set of spectral data from a different, second set of spectral data. Under certain conditions, this otherwise ill-posed transformation may indeed be possible. This achievement may be explained as follows.

First, the set of hyperspectral signals that the sensory system can ever encounter may be confined to a low dimensional manifold within the high or even infinite-dimensional space of all hyperspectral signals. Second, the frequency of metamers within this low dimensional manifold may be relatively low. In colorimetry, metamerism is often defined as the matching of an apparent color of objects with different spectral power distributions. Colors that match this way are called metamers. If both conditions hold, as the present case provides, the response of the RGB sensor may in fact reveal much more on the spectral signature than first appears, and the mapping from the latter to the former is indeed achievable.

Interestingly enough, the relative frequency of metameric pairs in natural scenes has been found to be as low as $10^{-6}$ to $10^{-4}$ (see, D. Foster, K. Amano, S. Nascimento, and M. Foster, *Frequency of metamerism in natural scenes*, JOSA A, 23(10):2359-2372, 2006). This very low rate may suggest that at least in this particular domain, confusion between surface identity may be very unlikely. Additionally, repeated findings have been reported to suggest that the effective dimension of visual spectrum luminance may be relatively low.

The spectral reflectance of an object may be determined by two main factors: its material composition and the spectral properties of the illumination. While many factors may affect the spectrum reflected by a material sample in subtle ways, it may be generally viewed as a linear combination of the reflected spectra produced by the different materials composing the sample. Although the range of possible materials in nature may be large, it is conceivable to assume that only few may contribute to the spectrum measured at each particular pixel in the hyperspectral image. Hence, an advantageous way to represent spectra observed in natural images may be a sparse combination of basis spectra stored in a dictionary, as the present method provides.

Building upon the observed sparsity of natural hyperspectral images, the present approach for reconstruction of hyperspectral data from RGB measurements may be formalized as follows. Let $D_h$ be an overcomplete dictionary of hyperspectral signatures $h_i$ (expressed as column vectors) in natural images:

$$D_h = \{h_1, h_2, \ldots, h_n\} \quad (1)$$

Once obtained, the dictionary may be projected to the sensor space via the receptor spectral absorbance functions. While this formulation may be general and suit different types of sensors, here we may focus on RGB sensors and the RGB response profiles. If $d = \dim(h_i)$ is the dimension of the spectral signatures after quantization to the desired resolution, these projections may be expressed as inner products with matrix R of dimensions 3×d which may yield a corresponding RGB dictionary $D_{rgb}$:

$$D_{rgb} = \{c_1, c_2, \ldots, c_n\} = R \cdot D_h \quad (2)$$

of three dimensional vectors $c_i = (r_i, g_i, b_i)^T$ such that $$c_i = R \cdot h_i \, \forall c_i \in D_{rgb}. \quad (3)$$

The correspondence between each RGB vector $c_i$ and its hyperspectral originator $h_i$ may be maintained for the mapping from RGB to hyperspectral signatures. This may also complete the pre-processing stage which is done only once.

Given an RGB image, the following steps may be used to estimate the corresponding hyperspectral image of the scene. For each pixel query $c_q=(r_q, g_q, b_q)^T$ encountered in the RGB image, a weight vector w may be found such that:

$$D_{rgb} \cdot w = c_q \qquad (4)$$

Once w is found, the spectrum $h_q$ underlying $c_q$ may be estimated by the same linear combination, this time applied on the hyperspectral dictionary:

$$h_q = D_h \cdot w \qquad (5)$$

Since $D_{rgb}$ was generated from $D_h$, it may follow (from equations 2 and 4) that the reconstructed spectrum may be consistent with the dictionary:

$$c_q = R \cdot h_q \qquad (6)$$

Whether $h_q$ is indeed an accurate representation of the hyperspectral data that generated the pixel $c_q$ depends on the representational power of the dictionary, which has been demonstrated empirically in the experiments discussed below.

Unless specifically stated otherwise, as apparent from the above discussions, it is appreciated that throughout the specification discussions utilizing terms such as "processing," "computing," "calculating," "determining," or the like, refer to the action and/or process of a computing system or a similar electronic computing device, that manipulate and/or transform data represented as physical, such as electronic, quantities within the computing system's registers and/or memories into other data similarly represented as physical quantities within the computing system's memories, registers or other such.

Some embodiments may be implemented, for example, using a computer program product stored on a computer-readable medium or article which may hold an instruction or a set of instructions that, if executed by a computer (for example, by a hardware processor and/or by other suitable machines), cause the computer to perform a method and/or operation in accordance with embodiments of the invention. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any type of disk including optical disks, CD-ROMs, magnetic-optical disks, read-only memories (ROMs), random access memories (RAMs) electrically programmable read-only memories (EPROMs), electrically erasable and programmable read only memories (EE-PROMs), flash memories, magnetic or optical cards, or any other type of media suitable for storing electronic instructions, and capable of being coupled to a computer system bus.

The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, such as C, C++, C #, Java, BASIC, Pascal, Fortran, Cobol, assembly language, machine code, or the like.

Figure 2:
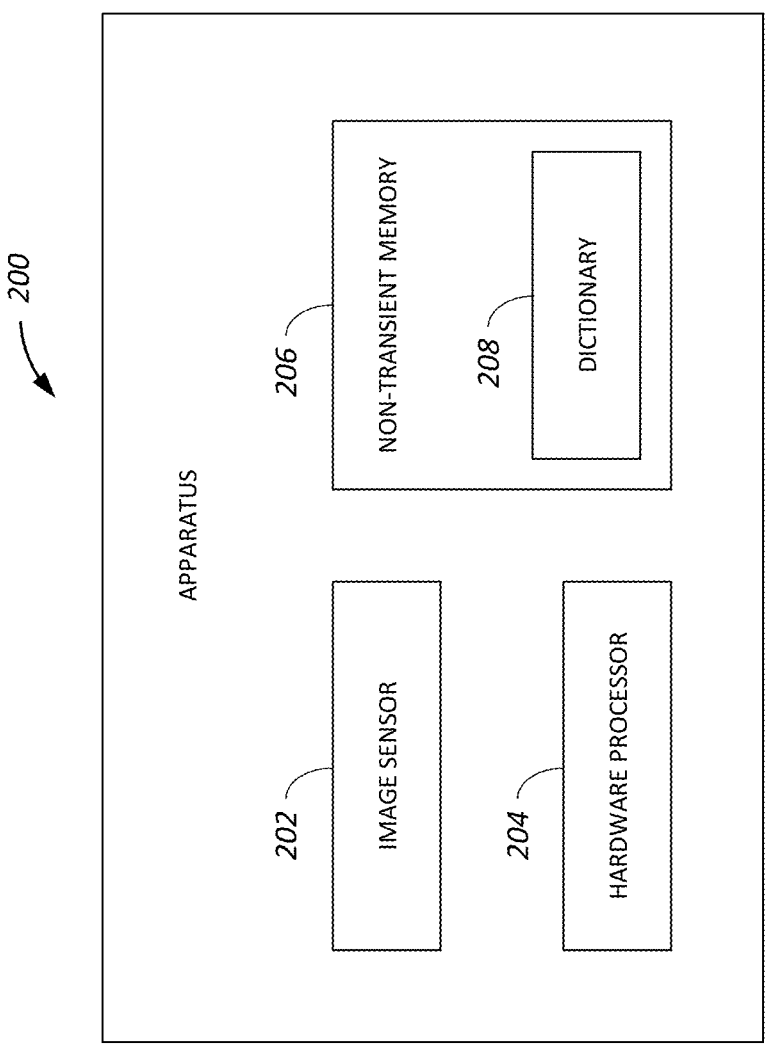
FIG. 2 shows a block diagram of an apparatus, in accordance with an embodiment.

Advantageously the present method may be utilized for harnessing a visible-light (also referred to as RGB) digital camera, optionally a consumer-grade camera, for the purpose of reconstructing a digital image richer than the one actually acquired by the camera. Reference is now made to FIG. 2, which shows a block diagram of an exemplary apparatus 100, in accordance with some embodiments.

Apparatus 100 may be, for example, a digital camera. Apparatus 100 may be equipped with an image sensor 202 (optionally RGB), a hardware processor 204 and a non-transient (also referred to as "non-volatile") memory 206. Non-transient memory 206 may store the aforementioned dictionary or multiple dictionaries for different domains, referenced here with the numeral 208. Following an acquisition of a digital image (for example RGB) by image 202, hardware processor 204 may approximate spectral data belonging to a different set of spectral bands, based on a correspondence between values (for example RGB values) in the digital image and signatures of the spectral data belonging to the different set of spectral bands, as discussed above.

Experimental Results

The disclosed method was tested using images from a new hyperspectral database acquired by the inventors using a Specim PS Kappa DX4 hyperspectral camera and a rotary stage for spatial scanning. At this time, 100 images were captured from a variety of urban (residential/commercial), suburban, rural, indoor, and other natural scenes. All images were 1392×1300 in spatial resolution and 519 spectral bands (400-1000 nm at roughly 1.25 nm increments). For comparison purposes, and whenever possible, previously published datasets and benchmarks were used.

The spectral range used from each image was limited roughly to the visual spectrum and computationally reduced via proper binning of the original narrow bands to 31 bands of roughly 10 nm in the range 420-720 nm. This was done both to reduce computational cost but mostly to facilitate comparisons to previous benchmarks. To test the present method, a test image from the database was selected and mapped to RGB using CIE (International Commission on Illumination) 1964 color matching functions. 10,000 random samples from all remaining images were then used to create the overcomplete hyperspectral dictionary $D_h$ using the K-SVD (Singular Value Decomposition) algorithm. The dictionary size was limited to 300 atoms, under a sparsity constraint of 50 non-zero weights per atom. The resulting dictionary was then projected to RGB to form $D_{rgb}$. Once all these components have been obtained, the hyperspectral signature of each pixel of the test image was estimated as described above, where the dictionary representation of each RGB pixel was computed with the OMP (Orthogonal Match Pursuit) algorithm. This process was repeated until each image had been selected for testing and independently reconstructed several times to discount the stochastic aspect of the dictionary.

The reconstructed hyperspectral images were compared to ground-truth data from the database and RMSE (Root Mean Square Error) errors were computed. Additionally, the same process was repeated for specific image subsets in the database (urban scenes, rural scenes, etc.) in order to explore the effect of domain-specific prior on reconstruction performance.

Reference is now made to FIGS. 3A-D, which show graphs of random samples of reconstructed spectra (dashed) and ground truth data (solid). It exemplifies the quality of spectra reconstruction obtained with the disclosed method (recall that the only input during reconstruction is the RGB signal). This type of results, that represent not only qualitative but also very accurate quantitative reconstructions, may characterize the vast majority of pixels in all images in the database. In a comparison of the reconstructed and ground truth spectral bands for two selected images, relatively shallow error maps were resulted (using the same scale as used in Kawakami et al. for comparison). See R.

Kawakami, J. Wright, T. Yu-Wing, Y. Matsushita, M. Ben-Ezra, and K. Ikeuchi, *High-resolution hyperspectral imaging via matrix factorization*, in Computer Vision and Pattern Recognition (CVPR), 2011 IEEE Conference on, pages 2329-2336, 2011.

Table 1 presents pooled results from the evaluation process described above (absolute RMSE values are shown in the range of between 0 and 255):

TABLE 1

| Data Set | Relative RMSE | Absolute RMSE |
| --- | --- | --- |
| Complete Data Set | 0.0756 | 2.633 |
| Park Subset | 0.0589 | 2.105 |
| Indoor Subset | 0.0507 | 1.417 |
| Urban Subset | 0.0617 | 2.260 |
| Rural Subset | 0.0354 | 1.582 |
| Plant-life Subset | 0.0469 | 1.816 |
| Chakrabarti Outdoor | 0.1231 | 3.466 |
| Chakrabarti Indoor | 0.5207 | 5.685 |

Figure 4:
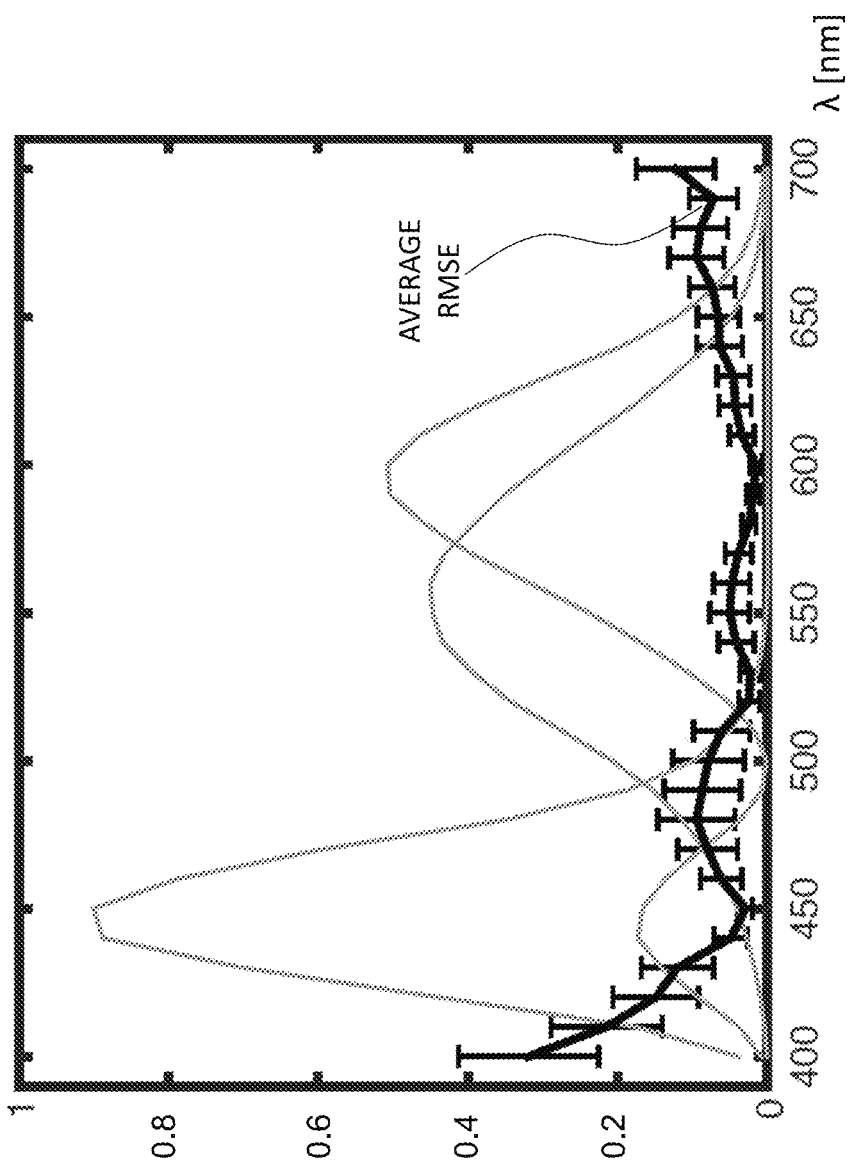
FIG. 4 shows a graph of the average RMSE per spectral channel of reconstructed images vs. CIE 1964 color response functions, in accordance with an embodiment.

Reference is now made to FIG. 4, which shows a graph of the average RMSE per spectral channel of reconstructed images. On average, across the entire experimental database, hyperspectral images were reconstructed with RMSE error of 2.74. Performance did not vary significantly per spectral channel, excluding the 700-720 nm range where CIE 1964 color matching provides little to no RGB data. When both dictionary construction and the reconstruction procedures are restricted to specific domains, performance typically improves even further since images from a certain category are more likely to share hyperspectral prior. It is therefore expected that the present method will perform especially well in restricted domain tasks. As the table suggests, the only exception to this prospect is the indoor category where the variety of artificial light sources provides greater variability in the hyperspectral prior which challenges the sparsity assumption significantly more than other categories.

Finally, the approach was applied to the hyperspectral database acquired by Chakrabarti and Zickler (Id.). Dividing the set to indoor and outdoor images, average RMSE over each of these subsets is reported at the bottom of the above table. Note that while average RMSE over these data sets are still relatively low and comparable to previous reported results (e.g., Kawakami et al., Id.), performance is noticeably degraded compared to the present database, in part because of hyperspectral blurring that contaminates the data.

The present approach has been compared to results presented by Kawakami et al. (Id.) and tested on the Yasuma data set (Id.). As noted earlier, this data set contains 32 studio images, many of which contain large dark background areas. Naive acquisition of the hyperspectral prior by randomly sampling these images is likely to produce a biased dictionary where the genuine hyperspectral information is severely underrepresented. Additionally, being an indoor collection of different random objects, it is unlikely that a prior collected from one could be used successfully to reconstruct spectral signatures for others. To overcome these limitations, a hyperspectral prior was sampled from each image separately before reconstruction. 10,000 pixels (3.8% of each image) were sampled either randomly from the entire image or from a central region of the image to avoid the dark (hyperspectrally poor) background, if existed. These were then reduced computationally to a 300-vector hyperspectral dictionary. Additionally, initial atoms for the K-SVD algorithm were selected either randomly from the sampled prior, or via maximization of the distance between their projected RGB values. Reconstructions were performed using each of the resulting dictionaries and the results are reported in Table 2 (absolute RMSE values are shown in the range of between 0 and 255):

TABLE 2

| | | | Image Subset | | | | | | | |
| --- | --- | --- | --- | --- | --- | --- | --- | --- | --- | --- |
| Method | Dataset Avg. | Subset Avg. | Balloons | Beads | Sponges | Oil painting | Flowers | CD | Fake/Real peppers | Photo and face |
| Factorization | — | 5.2 | 3.0 | 9.2 | 3.7 | 4.7 | 5.4 | 8.2 | 4.7 | 3.3 |
| Present embodiments | 5.4 | 5.9 | 8.9 | 5.5 | 3.5 | 3.5 | 6.3 | 9.5 | 6.7 | 3.9 |

As can be observed in this table, despite using only RGB for reconstruction, results are comparable (note that Kawakami et al. (Id.) reported results on 8 images out of the entire database). Importantly, while Kawakami et al. (Id.) reported computation of several hours for factorization and reconstruction of a 4008×2672 image on an eight-core CPU, the present algorithm completed both dictionary construction and image reconstruction in seconds (timed on an Intel Core i5-2400 personal computer, having a clock speed of 3.1 GHz, using Matlab implementation). In some embodiments, the disclosed method may be massively parallelized, for examples using separate processors or cores since the reconstruction of each pixel is independent of the others.

In some embodiments, the present method provides the ability to turn consumer-grade RGB digital cameras into hyperspectral acquisition devices, thus permitting truly low cost and fast HISs. The challenging aspect of this process would be the acquisition of hyperspectral prior calibrated with the target RGB camera, or equivalently, accurate knowledge of the camera filter response profiles, white balancing, and gain control procedures, and all other image processing done on board that affect the eventual reported RGB image. This has proven possible by the present inventors, by acquiring RGB images with a Canon 400D DSLR (Digital Single Lens Reflex) camera and the corresponding hyperspectral images (for both dictionary construction and as ground truth for evaluation of reconstruction error) using the Specim camera. Hyperspectral prior was computed using the estimated spectral response profiles of the DSLR (see H. Zhao, R. Kawakami, R. Tan, and K. Ikeuchi, *Estimating Basis Functions for Spectral Sensitivity of Digital Cameras*, in Meeting on Image Recognition and Understanding, volume 7, 2009.) Spectral range was limited to 31 bands of roughly 10 nm in the range 400-700 nm, corresponding to the range of the DSLR response profile. However, present embodiments are not limited to this number of bands nor to their widths.

Figure 5A:
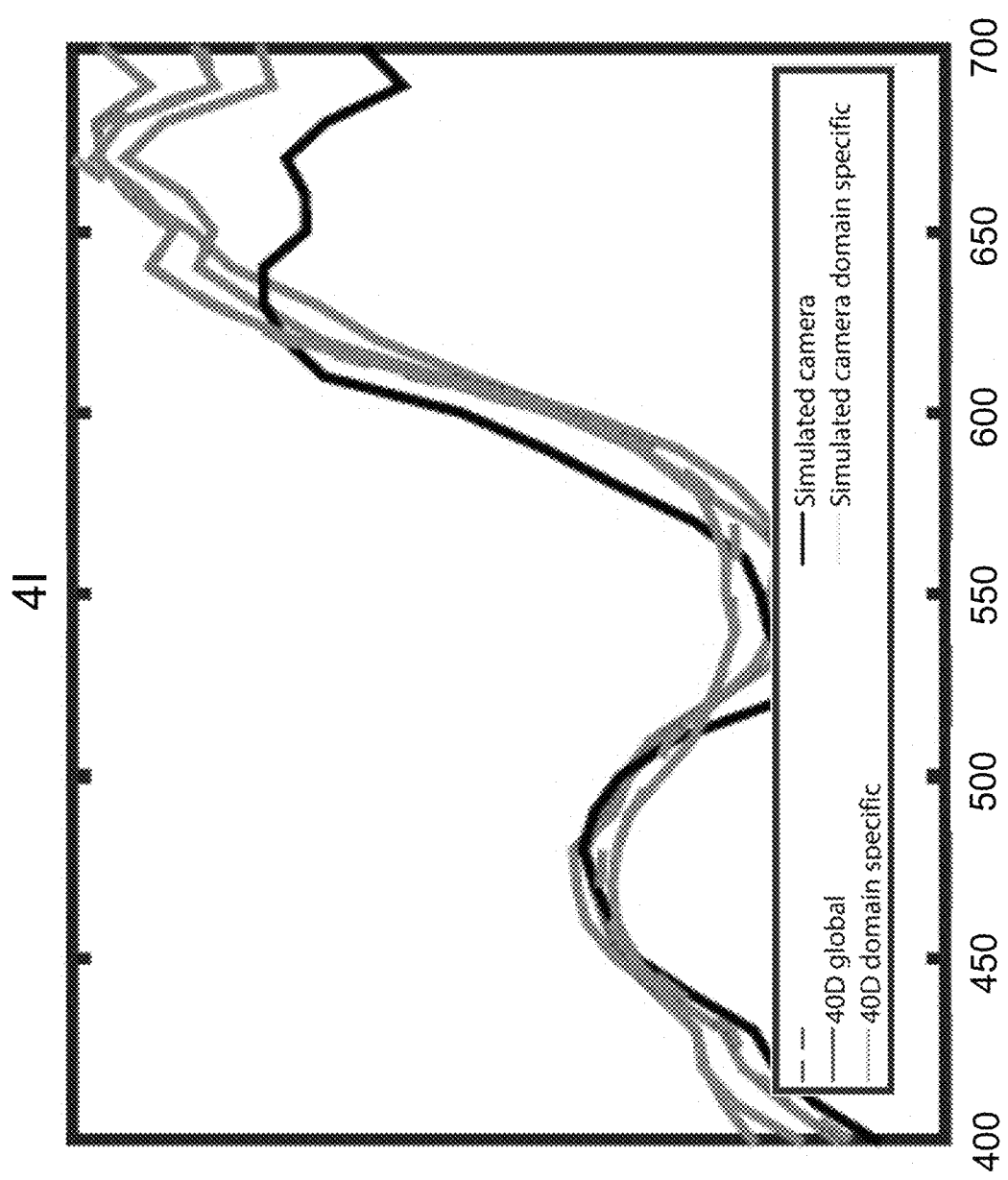
Figure 5B:
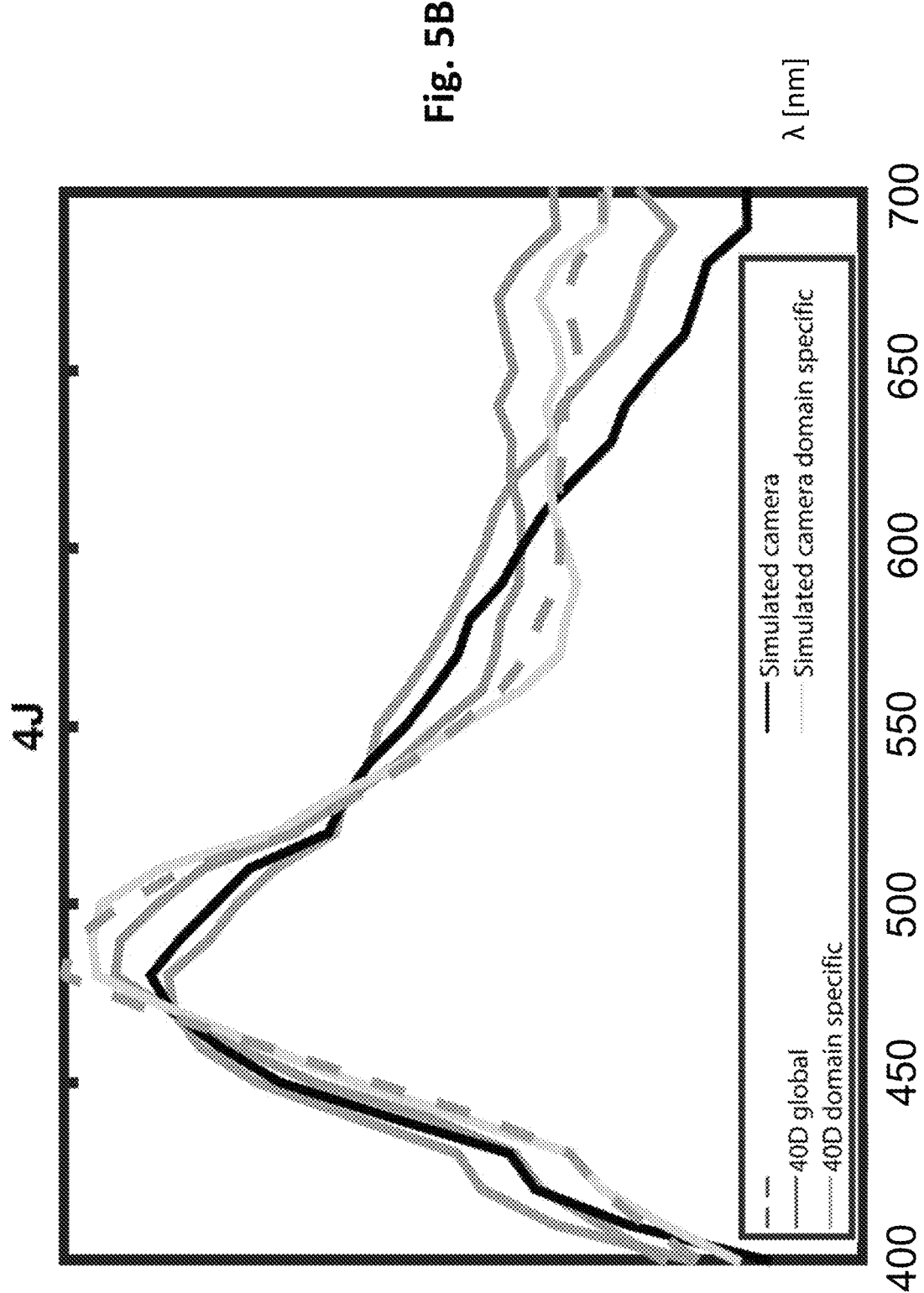

Reconstruction and evaluation procedures were repeated as described above for several corresponding points between the acquired hyperspectral and RGB images as determined by manual registration. Reference is now made to FIG. 5A-C, which show graphs of samples of reconstructed spectra (solid lines) and ground truth (dashed) for consumer and simulated RGB camera input. While no calibration procedures were performed (excluding white balance adjustments), full spectral luminance was recovered with high accuracy across the scene and over a variety of different materials, suggesting that full calibration information about the target RGB device can lead to a true high-accuracy low cost HIS based on present embodiments.

Selection of Optimized Color Filter Array

Disclosed herein is a method for selecting an optimized color filter array (CFA) for improved camera performance metrics. These metrics may include increased photon efficiency (also known as quantum efficiency), as well as exposure uniformity, and improved recovery of HS data from an RGB image. However, it will be appreciated that additional performance metrics may be considered. The method may further assign weightings to each of these parameters, to produce a target system with desired properties.

Figure 6:
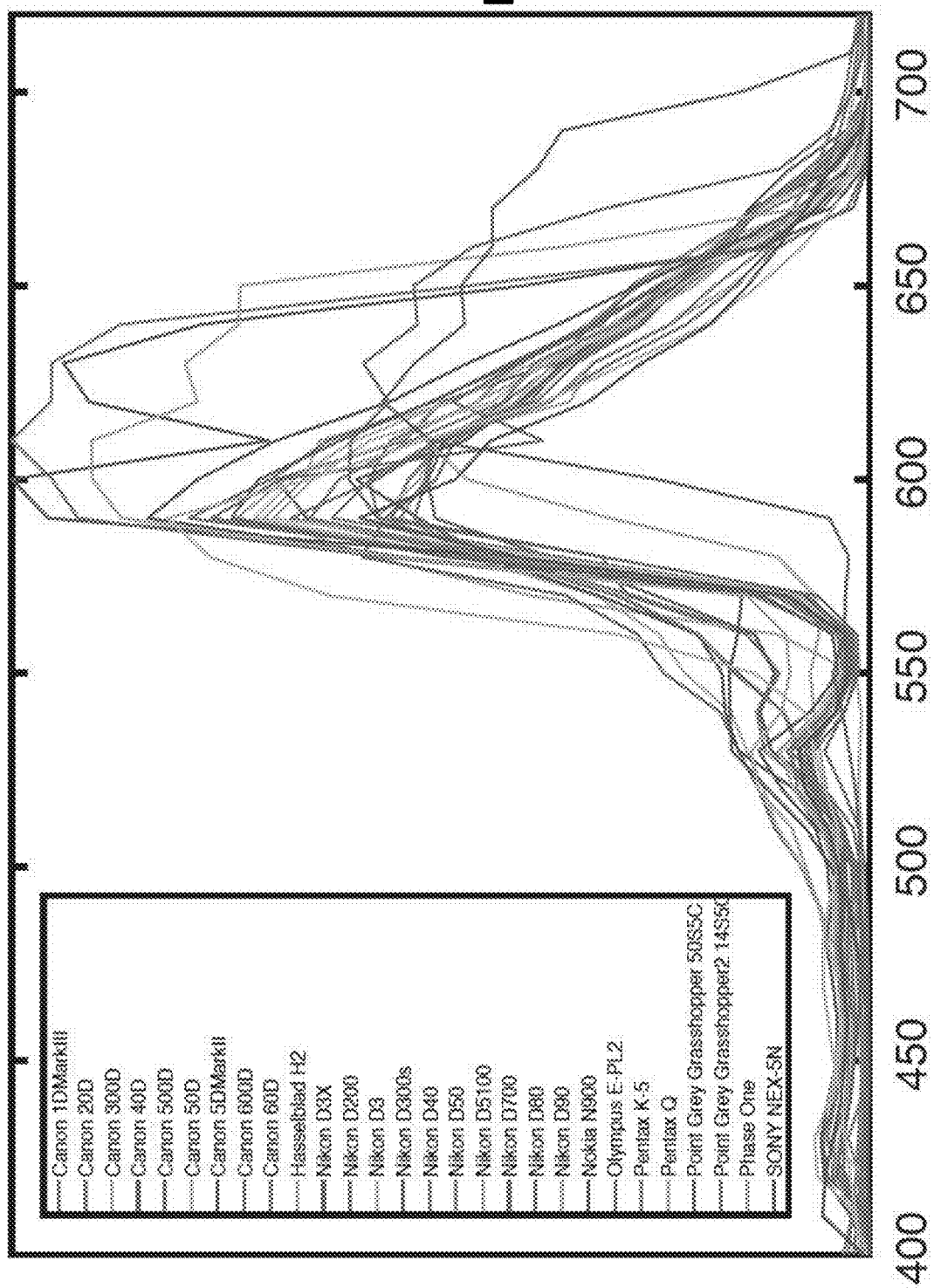
FIG. 6 illustrates the variability found in a set of multiple commercially-available cameras with respect to the response functions in the red channel.

By way of example, the method discussed above under "Recovery of Hyperspectral Data from RGB Images" demonstrates the recovery of whole-scene HS information a standard RGB camera. Although high accuracy HS estimation has been demonstrated using only consumer-grade RGB cameras, it will be appreciated that not all RGB cameras are created equal, as their spectral response across multiple spectral bands may vary significantly from one another. In fact, camera response functions vary not only across manufacturers or camera classes, but often even between generations of similar camera models (e.g., iPhone 6 vs. iPhone 7, Canon 70D vs. Canon 80D, etc.). FIG. 6 illustrates the variability found in a set of multiple commercially-available cameras with respect to the response functions in the red channel.

Accordingly, it would be desirable to provide a method for efficient and practical selection of a filter array for various considerations, including optimized spectral response for HS data recovery, as well as improved photon efficiency.

Current Color Filter Arrays in Digital Cameras

The majority of RGB cameras use a photo sensor, e.g., a Complementary Metal Oxide Semiconductor (CMOS) or a Charge-Coupled Device (CCD) sensor, composed of a plurality of individual pixel sensors. The photo sensor typically is overlaid with a color filter array (or CFA), or color filter mosaic (CFM), which is an arrangement of tiny color filters placed over the individual pixel sensors of the image sensor. Color filters are needed because the typical photo sensors detect light intensity with little or no wavelength specificity, and therefore cannot separate color information.

The color filters filter the light by wavelength range, such that the separate filtered intensities include information about the color of light. For example, the common Bayer CFA is a mosaic of alternately-arranged miniature RGB color filters on a square grid of photo sensors. The Bayer CFA arrangement of color filters is used in many single-chip digital image sensors used, e.g., in digital cameras, camcorders, and scanners, to create a color image. The Bayer mosaic pattern is generally 50% green, 25% red, and 25% blue. Each individual filter gives, for the corresponding individual pixel sensor, information about the intensity of one of the spectral bands of light in red, green, and blue (RGB). This single-band data captured by the pixel sensor is then converted to a full-color image (with intensities of all three RGB bands represented at the individual pixel sensor level) by a 'demosaicing' or 'debayering' algorithm. Demosaicing can be performed in different ways.

Simple methods interpolate the color values of a pixel from the color values of neighboring pixels. For example, once the photo sensor has been exposed to an image, each pixel can be read. A pixel with a green filter provides a measurement of the green component for this pixel. The red and blue components for this pixel can then be obtained from immediately-neighboring pixels. For a green pixel, two red neighbors can be interpolated to yield the red value, and similarly, two blue pixels can be interpolated to yield the blue value. Thus, a complete RGB set of values is obtained for each pixel in the image.

Figures 7A, 7B:
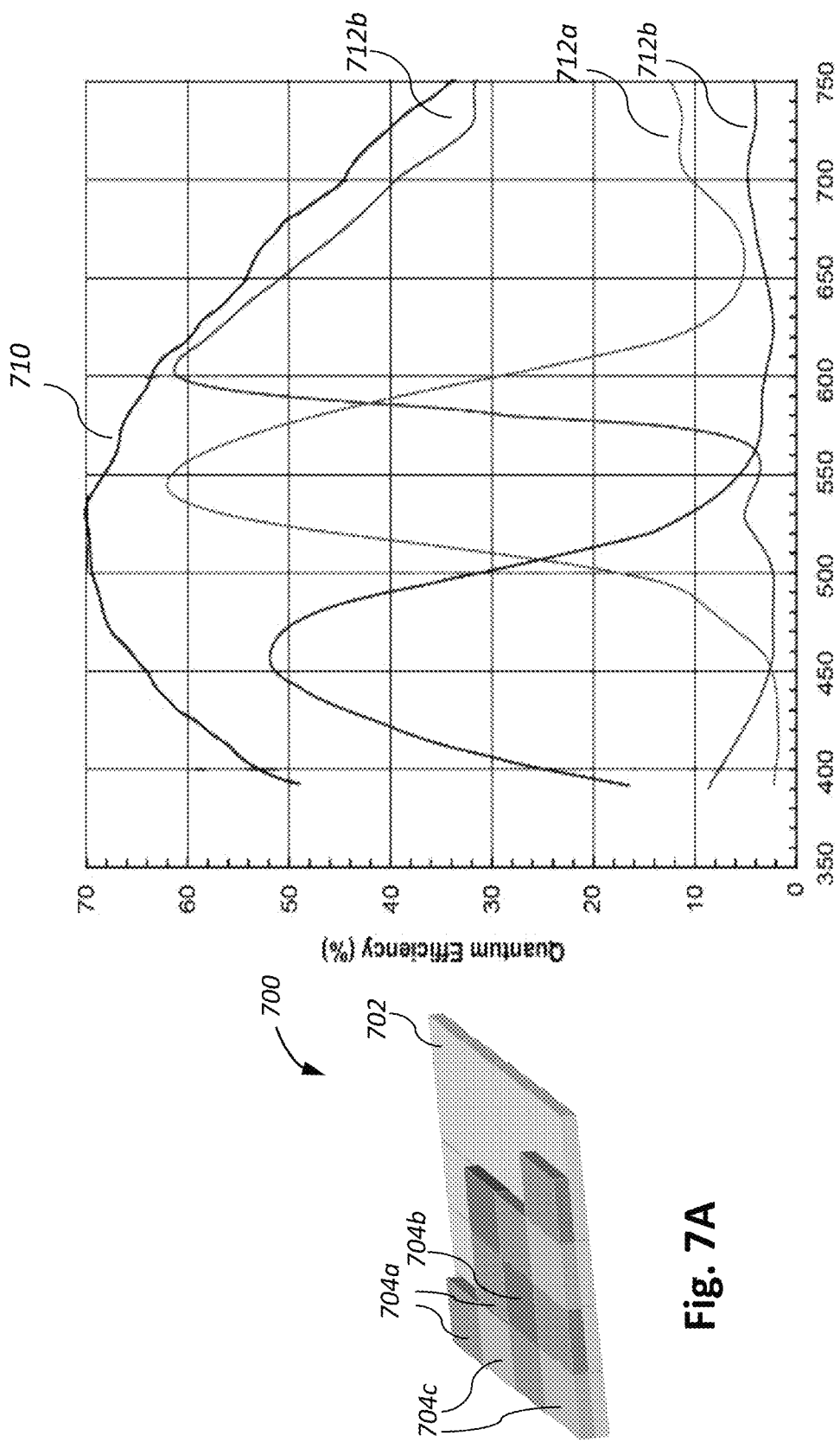
FIG. 7A shows a schematic view of a typical Bayer CFA arrangement.
FIG. 7B illustrates the quantum efficiency of a commercially-available image sensor, both with and without the application of a Bayer filter to the sensor surface.

Reference is made to FIG. 7A, showing a schematic view of a typical Bayer CFA arrangement 700. Individual pixels of photo sensor 702 are overlaid with a mosaic of green 704a, red 704b, and blue 704c filters. The response profile of each filter aims to approximate that of the corresponding color sensors in the human retina. Thus, each pixel in the photo sensor 702 records the intensity of light within wavelengths perceived by humans as red, green, or blue, by virtue of its corresponding filter. These measurements by the individual pixels are then combined to produce a full color image via a debayering interpolation process. This approach allows for relatively accurate color reproduction, but comes at the cost of significantly reduced sensor quantum efficiency. The graph in FIG. 7B provides an illustration of the quantum efficiency of a commercially-available image sensor, both with and without the application of a Bayer filter to the sensor surface. In this sensor and others, the Bayer filter reduces photon efficiency by over 60% (lines representing green 712a, red 712b, and blue 712c channels) when compared to a monochrome version (line 710) of the same sensor, i.e., absent the Bayer CFA.

While not all color imaging systems employ a Bayer filter, the majority of them employ some type of a red, green, blue filter system which imposes similar limitations on quantum efficiency. For example: 3-CCD systems employ a color separation beam-splitter to direct red, green, and blue light to 3 distinct sensors.

If a color image is desired, one cannot simply remove the Bayer filter, as the underlying image sensor can only detect light intensity and will not provide any color information. During recent years, many attempts have been made to design alternative color filter arrays with reduced impact on quantum efficiency.

Figure 7E:
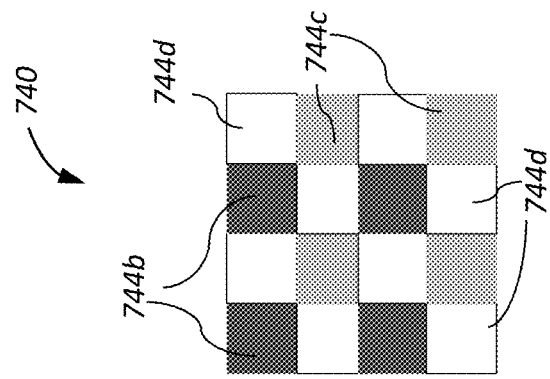
FIGS. 7C-7E schematically illustrate a Bayer CFA and common alternatives thereto.
Figure 7D:
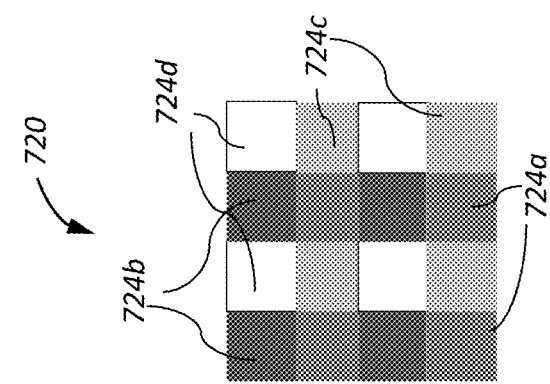
Figure 7C:
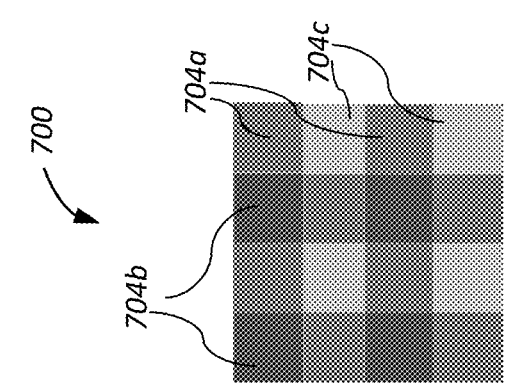

The Bayer CFA and common alternatives thereto are illustrated in FIGS. 7C-7E. A Bayer CFA 700 typically comprises 50% green 704a, 25% red 704b, and 25% blue 704c, individual filters. CFAs known as RGB-C or RGB-W, such as CFA 720 in FIG. 7D, replace one or more of the Bayer CFA green pixels with a transparent, "clear" or "white" filter 724d, one without any color filtering properties. Certain designs, such as Samsung's BriteCell CFA 740, illustrated in FIG. 7E, forgo the green pixels altogether, opting instead for two "white" pixels 744d along a red and blue pixel in each 2×2 block of the array.

These alternative filter designs have two major drawbacks: reduced color accuracy and uneven exposure. Since even the original Bayer filter design relies on interpolation to produce complete color information for each pixel, RGB-W and similar arrays must do the same, but at an information disadvantage. Recovering color information from farther points of measurements (RGB-W) or estimating it completely (e.g., for the green channel in a BriteCell CFA), may result in color artifacts and/or spatial artifacts.

In color sensors which include "white" pixels alongside "color" pixels, exposure imbalance becomes a major concern, as the "white" pixels may absorb up to three times as much light as their "color" counterparts. In many situations, such sensors must either overexpose (saturate) their "white" pixels, or underexpose their "color" pixels. The former results in spatial artifacts while the latter results in reduced color accuracy and/or color artifacts.

An alternative approach that attempts to overcome the limitations of RGB-C/RGB-W sensors is dual-camera acquisition. This design calls for two image sensors in a close rectified calibrated array, one color sensor and one monochrome sensor. The highly quantum-efficient monochrome sensor is used to record luminance information, while the companion color sensor records color information. The two resulting images are combined via software to produce a single-color image. While this approach mostly overcomes the exposure and color accuracy issues or RGBW sensors, it introduces spatial errors due to the parallax effect, and requires a significant amount of additional hardware.

Considerations for Optimized Filter Selection for HS Data Recovery

When designing a CFA for a camera system, the following metrics may be considered:
(i) Quantum efficiency;
(ii) Exposure uniformity; and
(iii) HS reconstruction accuracy.

In addition, practical considerations, such as commercial availability and manufacturing costs and constraints should be taken into account.

In practical terms, the selection problem can be posed as a method for efficient and rapid evaluation of a set of CFAs comprising n component filters each (e.g., 3 or 4 component filters per CFA), selected from a given space or universe of components filters (e.g., 1,000) available for selection.

It will be appreciated that individual or manual evaluation of such a set of CFAs, even if the given space comprises only commercially-available component filters, is impracticable. While commercial availability and manufacturing constraints can be used to narrow down the filter component space from which the components comprising the optimized CFA must be selected, the resulting space may still be overwhelmingly large. For example, selecting a set of 4 component filters from a pool of 1,000 commercially-available filters results in over $10^{11}$ possible combinations. Evaluating each and every one of these filter sets for quantum efficiency, exposure uniformity, and HS reconstruction accuracy, is, for all practical purposes, unfeasible.

In order to overcome this problem, there is disclosed the following methodology for filter selection, which applies an evolutionary optimization algorithm to quickly search large filter spaces for optimal sets of filters. This methodology can apply several criteria for filter selection, using varying weights.

In the following discussion, the focus shall be on selection for HS reconstruction accuracy as the "fitness" metric. However, as noted above, other criteria, such as quantum efficiency and exposure uniformity, may be selected for as well, and varying weights may be assigned to each criterion, to determine the desired properties of the target system. For example: if the underlying sensor has a very high dynamic range, quantum efficiency may be prioritized over exposure uniformity, etc.

Figure 8A:
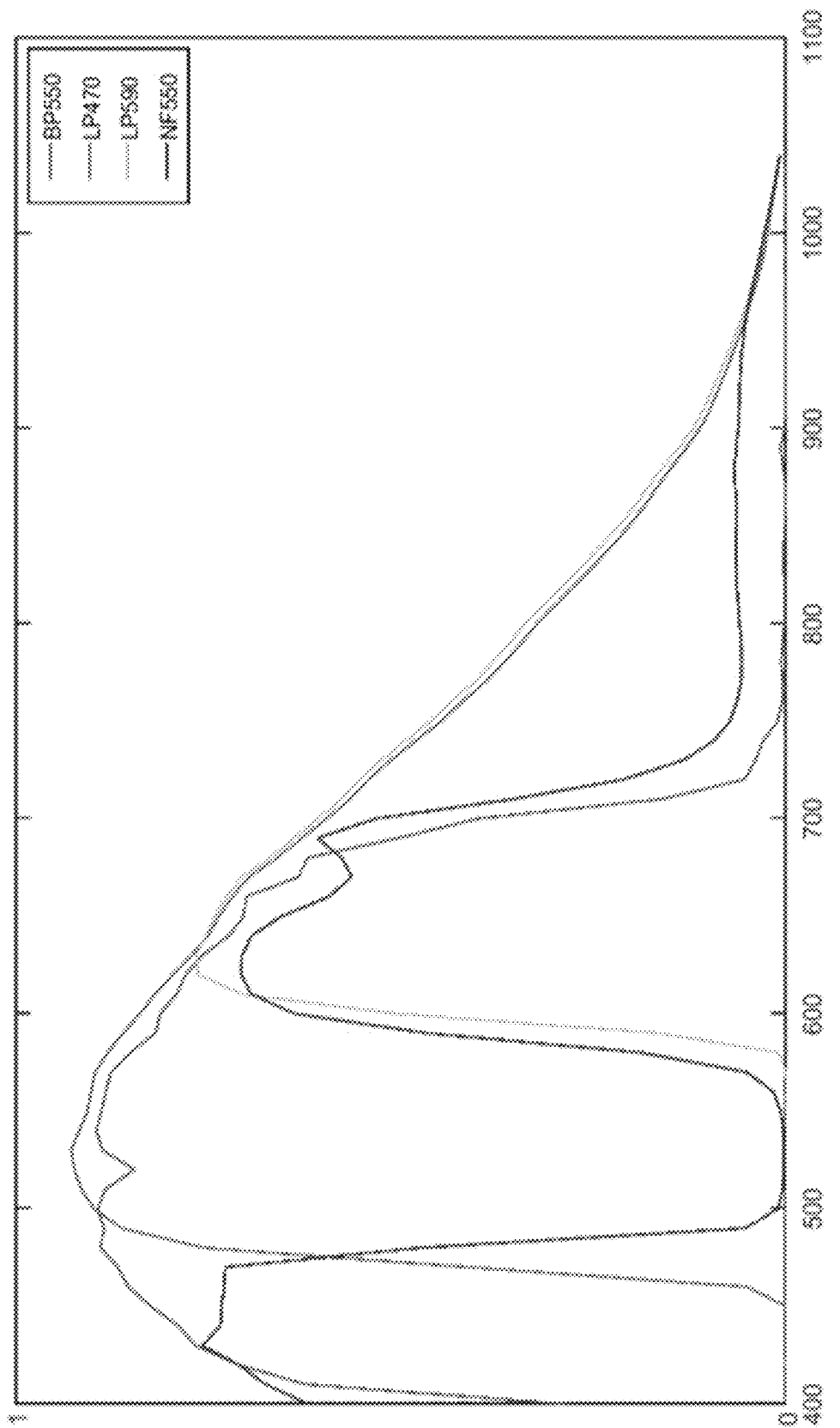
FIG. 8A illustrates the properties of a desired filter set.
Figure 8B:
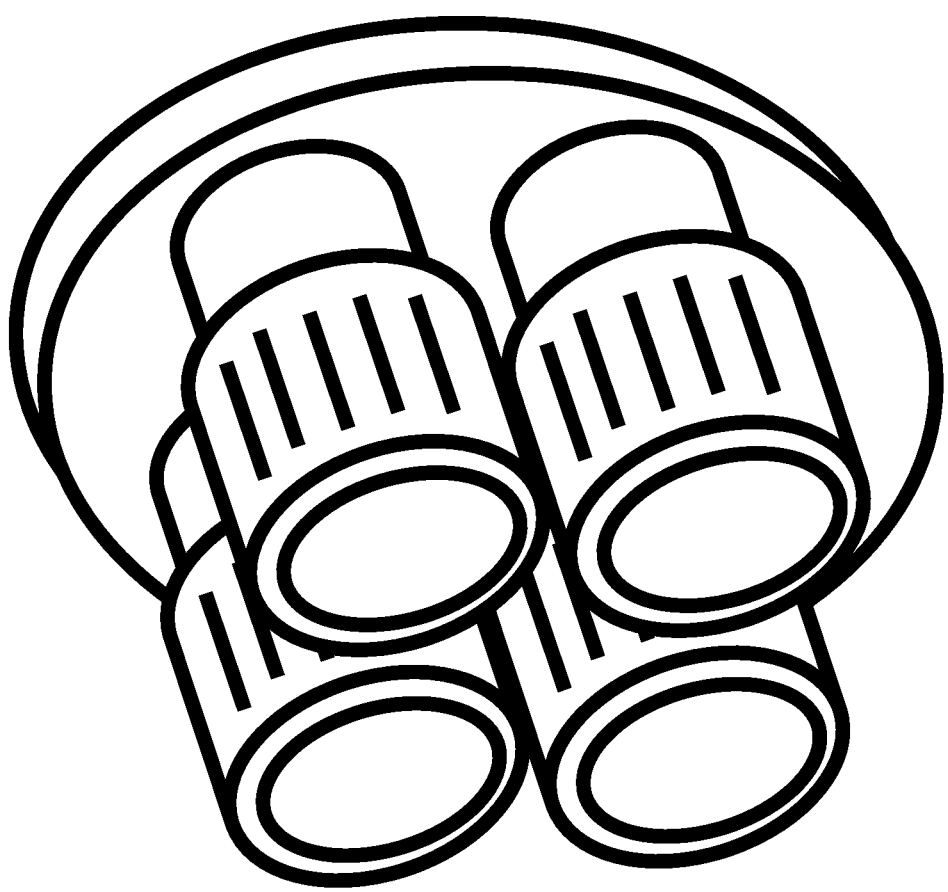
FIG. 8B shows a multi-camera array.

Applying this methodology to find a CFA comprising 4 component filters from a commercially-available filter set yields, e.g., a desired filter set whose properties are illustrated in the graph in FIG. 8A, where each line represents the quantum efficiency of one of the selected component filters. The optimal filter set can then be implemented in a CFA, as a multi-camera array depicted in FIG. 8B, or other optical designs (e.g., a beam-splitter).

When designing a camera system, several color filter arrays can be selected in order to shape its response to specific wavelengths, referred to as the filter set of the system. RGB cameras, for example, have filter sets of size 3, whose filters loosely approximate the CIE-1931 color matching functions. Filter sets of size n may be selected from some filter space comprising a finite (or infinite) number of filters describing all possible combinations of n filters from said space. The choice of a specific filter set from a given filter space clearly affects the camera system's sensor response. In addition, filter selection can profoundly impact the hyperspectral (HS) estimation performance of a camera system as well. In the case of off-the-shelf or consumer-grade equipment, a reasonable strategy for selecting an optimal camera response profile may be conducting a one-by-one evaluation of the products available in such space. Evaluating the expected performance of hundreds or even thousands of candidate cameras may be laborious, but as long as their response functions are known, it is a fairly straightforward process which can be completed in a relatively short time. Despite the diversity of response functions among consumer camera, there may be much to gain by exploring additional classes of filter sets, including those that differ significantly from the CIE-1931 color matching functions. Filter set optimization has been studied partially as part of "optimal band selection" in the field of remote sensing, but remains an open problem. Moreover, even if theoretically ideal filter sets could be easily computed, they may prove too complex to implement as optical coatings or in a Bayer CFA.

Hence in order to enjoy the advantages of an improved filter set within a low-cost system, filters must be selected from the domain of commercially-available, or inexpensively-manufacturable filters. Unfortunately, this constraint hardly reduces the complexity of the problem, as thousands of such filters are available through various optics vendors (e.g., the OMEGA Optical, Inc. catalog alone contains over 1,000 individual filter components). Additionally, many manufacturers are able to produce customized filters within specific sets of parameters at a relatively low cost. Even while considering only filter sets of size 3 selected from 1,000 off-the-shelf filters, the size of the possible combinations space quickly balloons to $10^8$, making an exhaustive search impracticable. The number of possible combinations increases by several more orders of magnitude when considering families of customizable filters and/or filter sets of size 4. The present disclosure aims to reduce the amount of computations necessary to estimate expected performance of a filter set, as well provide a method for quickly selecting a close-to-optimal filter set from a very large filter space.

As noted above, the focus herein is on filter selection for the reconstruction of HS signals from RGB or multispectral cameras. Evaluating the HS reconstruction performance of a filter set requires a training phase and a testing phase. During the training phase, each tested system is calibrated to reconstruct HS images from RGB images obtained under the tested filter set, by processing a set of HS training images. Once calibrated, the performance of each tested system may be evaluated in three steps. First, a set of tests RGB images is produced by simulating the spectral projection of fresh HS source images through the candidate filter set. Second, these test images are fed into a HS reconstruction algorithm (such as the one discussed above under "Recovery of Hyperspectral Data from RGB Images") to obtain reconstructed HS images. And finally, the reconstructed HS images are compared to their corresponding HS source images.

It will be appreciated that, although the following discussion focuses on the HS recovery method disclosed herein above under "Recovery of Hyperspectral Data from RGB Images," other methods of HS reconstruction from RGB images may also be used and benefit from the present method, e.g., the method proposed by R. M. H. Nguyen, D. K. Prasad, and M. S. Brown, Training based spectral reconstruction from a single RGB image, ECCV, volume 8695 LNCS, pages 186-201. Springer International Publishing, 2014 (referred to herein as "Nguyen").

Testing Procedure for Hyperspectral Recovery Performance of a CFA

In order to evaluate the HS performance of a given CFA, the inventors have devised the evaluation methodology discussed in this section. The evaluation steps discussed herein use the two reconstruction methods referred to above. Reported computation times were obtained on an Intel Core i5-2400 CPU desktop equipped with 24 GB of RAM.

With respect to the approach proposed by Nguyen, it should be noted that it includes components for recovery of both object reflectance and scene illumination. However, the following discussion is limited to the reflectance recovery methodology, which can be summarized as follows:

Training:
(i) Project each training image to RGB via the selected filter set;
(ii) perform illumination correction ("white balance") on projected images; and
(iii) use corrected RGB and HS pixels pairs to train a radial basis function (RBF) network.

Testing:
(i) Perform illumination correction ("white balance") on the test RGB image; and
(ii) use the RGB network produced by the training phase in order to estimate HS reflectance values for each pixel.

When implemented on a benchmark platform, the training process took approximately 4 minutes per filter set when performed over the 16,400 training pixels. Once trained, the system required 2 minutes to reconstruct $2.5 \times 10^6$ HS pixels over 31 channels. The most computationally intensive step in the training process is step (iii), i.e., training of the RBF network. As this step relies on HS images projected through the selected filter set as input, it must be repeated for each evaluated filter set. Hence the total time required for each filter set evaluation was 6 minutes.

The method disclosed by the inventors hereinabove under "Recovery of Hyperspectral Data from RGB Images" reconstructs HS radiance signatures from RGB pixels. The evaluation methodology used is as follows:

Training:
(i) Generate a sparse overcomplete HS dictionary from training images via the K-SVD algorithm; and
(ii) project the HS dictionary from step (i) via the selected filter set and obtain a corresponding overcomplete RGB dictionary.

Testing:
(i) Use the dictionary produced in step (ii) of the training process in order to represent each pixel in the test image via Orthogonal Match Pursuit (OMP); and
(ii) apply dictionary weights computed in step (i), to the dictionary produced in step (i) of the training process in order to estimate HS radiance values for each pixel.

When implemented on the benchmark platform, the training process took approximately 5 minutes when performed over 106 training pixels. Once trained, the system required 32 seconds to reconstruct $2.5 \times 10^6$ HS pixels over 31 channels. The most computationally intensive step in the training process is step (i), i.e., the generation of a HS dictionary (while step (ii) is negligible in time). As opposed to Nguyen, however, this step is completely independent of the evaluated filter set and does not have to be repeated for each evaluated filter set. Hence the time required for each filter set evaluation was 32 seconds.

Evaluation of Hyperspectral Recovery Performance of a CFA

As discussed immediately above, there were evaluated filter sets by comparing reconstructed HS images to their corresponding HS source images. In all experiments, reconstruction accuracy is reported as relative root mean square error (RRMSE), represented as:

$$E = \frac{\sum_{i,c} \frac{\sqrt{(P_{gt_{i_c}} - P_{rec_{i_c}})^2}}{P_{gt_{i_c}}}}{|P_{gt}|}$$

where $$P_{gt_{i_c}} \text{ and } P_{rec_{i_c}}$$

denote the c spectral channel value of the i-th pixel in the ground truth and reconstructed images respectively, and $|P_{gt}|$ is the size of the ground truth image (total pixels channels).

It must be emphasized that measuring relative errors, rather than absolute errors, is a much more conservative approach that ensures that errors in low luminance pixels and spectral channels are given equal weight to those in high luminance pixels/channels (even though they are typically much smaller in absolute values).

Experiments utilizing the Nguyen method were based on code provided by Nguyen et al. Experiments utilizing the method disclosed by the inventors hereinabove under "Recovery of Hyperspectral Data from RGB Images" were based on implementation by the inventors. In this implementation, images projected to the camera-domain were truncated to 3 significant digits before further processing, in order to simulate the limited dynamic range of camera sensors.

It will be appreciated that the purpose of the testing was not to compare between the two reconstruction methods or argue that one is superior to the other. Rather, the aim was to demonstrate that filter selection has a significant impact on reconstruction performance even when estimation methods and target scenes differ.

Finally, it is noted that a main goal of the method disclosed herein is to devise a filter selection methodology for very large filter spaces. Accordingly, although it has been demonstrated that both recovery methodologies are significantly impacted by filter selection, the larger scale experiments discussed below employ only the recovery method disclosed hereinabove, whose processing time per filter set is an order of magnitude shorter.

Evaluation Results

Figure 9:
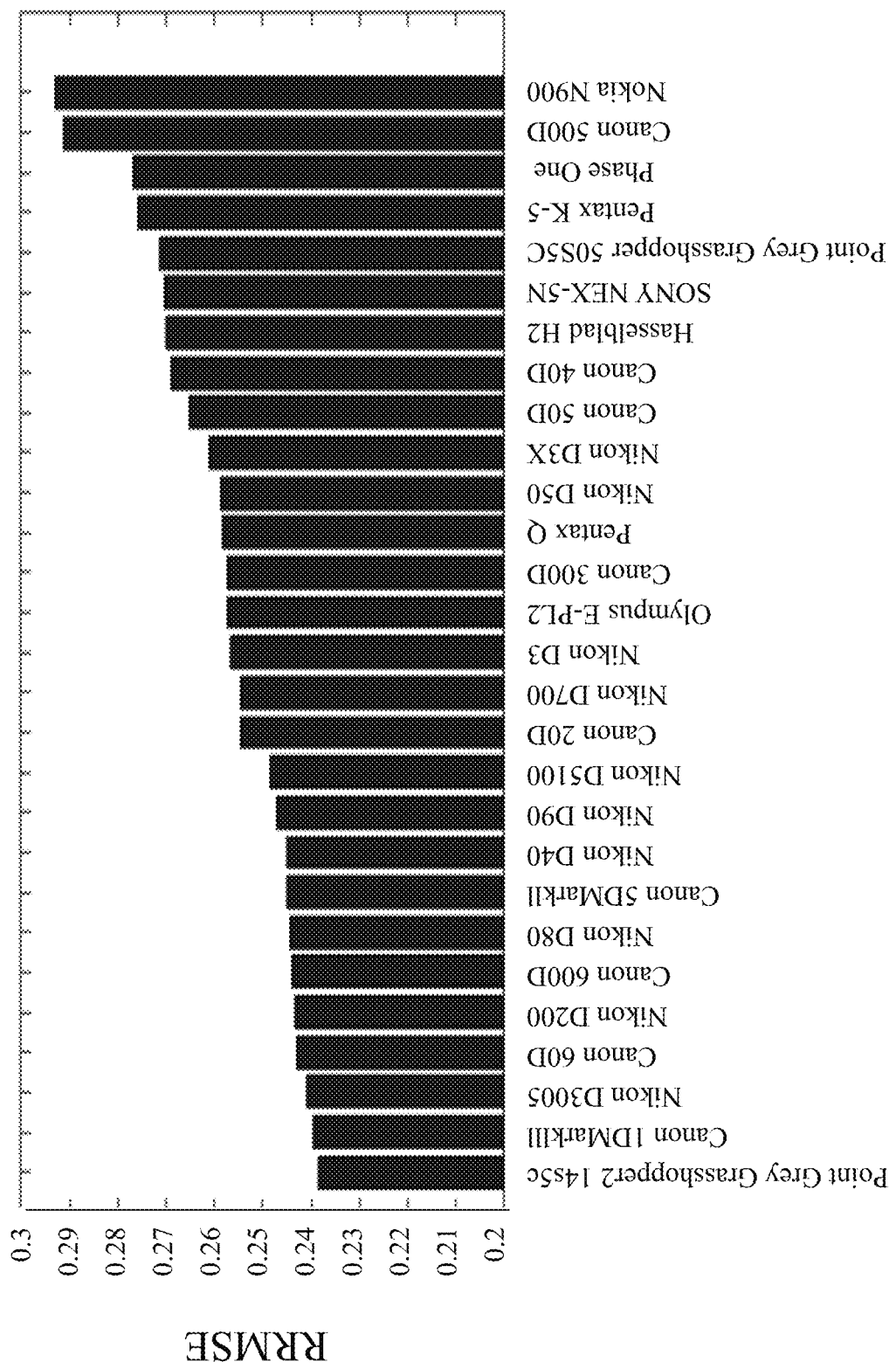
FIGS. 9-10 show results of hyperspectral reconstruction evaluations using commercially-available cameras.

In order to evaluate the effects of small changes in CFA response functions on recovery of HS data from an RGB image, there was conducted an experiment evaluating HS reconstruction performance over 28 simulated cameras. In order to evaluate the impact of filter selection on the Nguyen method, RBF networks were trained for each of the 28 camera response functions using unmodified code provided by the inventors. The training image set comprised of 16,400 HS pixels while the test image set comprised of 25 full test images containing a total of $5.6 \times 10^7$ HS pixels. FIG. 9 depicts sorted RRMSE values of test images vs. estimated reflectance across all cameras. While differences in performance between individual cameras may be small, a clear gap and 18.7% improvement are easily observed between the worst (RRMSE=0.293) and the best (RRMSE=0.238) preforming cameras.

Figure 10:
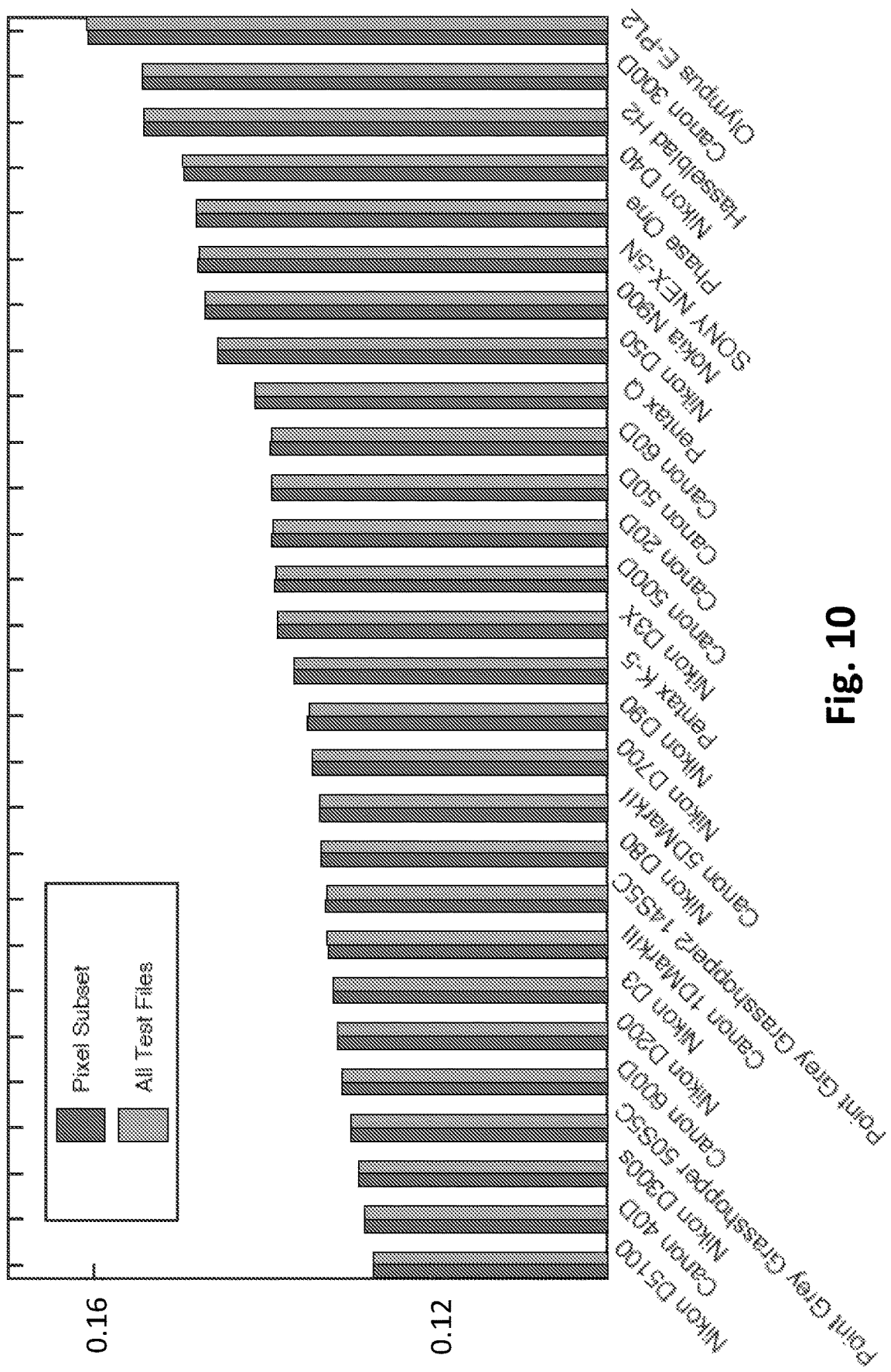

A similar evaluation process was performed for the present method disclosed above under "Recovery of Hyperspectral Data from RGB Images." As most of the training process in this method is independent of the evaluated filter set, the training set comprised of $10^6$ pixels randomly selected from an HS database comprising 51 training images (20,000 pixels per image). A second set of 51 images from the same database was used for the test phase. FIG. 10 illustrates the reconstruction performance and again, a clear gap and 20.6% improvement are easily observed between the worst (RRMSE=0.160) and the best (RRMSE=0.127) preforming cameras.

In order to allow rapid filter selection from much larger filter spaces, a second experiment was performed over just $2.5 \times 10^6$ pixels randomly sampled from the 51 image test set. As FIG. 10 shows, this sampling approach provides virtually identical results. Indeed, the random pixel sample behaves as a very strong predictor for performance over the entire test set (maximum relative difference <0.09%), thereby facilitating similar evaluation and filter selection over the much larger filter sets Method for Evolutionary Optimization of Filter Sets As demonstrated above, HS reconstruction performance may vary significantly across CFA sets, even if only a small number of consumer camera filter sets are considered. Since none of these cameras were designed with HS reconstruction in mind, optimal filter selection over filter spaces beyond such commercial cameras may offer significant performance gains for HS reconstruction. That said, evaluating performance of a specific filter set in the task of HS estimation may be a computationally intensive task. Depending on the methodology used, reconstruction of a single 1 megapixel (MP) test image may take several seconds. Therefore, an exhaustive evaluation of a large filter space remains impracticable. To further compound the problem, the filter space (the space of filter combinations) is neither continuous nor convex. Hence it is unlikely that convex optimization methods will converge to an optimal solution.

Fortunately, evolutionary algorithms are well suited for such problems and may provide a near-optimal solution at a significantly lower computational cost than individual evaluation. In order to efficiently discover filter sets well-suited for HS reconstruction within large filter spaces, an evolutionary approach is applied. A set of random filter combinations is generated from the entire space. These filter sets are evaluated and ranked for reconstruction performance. Then the following iterative procedure is carried out, whereby a new set of filter combinations, comprising new random combinations taken from the filter space, as well as highly-scoring previously-tested combinations, mutations of highly-scoring previously-tested combinations, and combinations of highly-scoring previously-tested combinations, as follows:

Survival of the fittest preserves the highest-rated previously-tested filter sets for inclusion in subsequent test groups;

crossover combines two filter sets from the previously-tested highest-rated sets based on their fitness ranking, to produce an "offspring" containing randomly selected filters from each of the two sets;

mutation produces a new filter set by randomly replacing one of the filter components in a previously-tested filter set; and random replacement creates new filter sets for evaluation from the entire filter space for the next iteration of the procedure.

The random replacement is produced by randomly selecting filters from the entire filter space. Each new "population" is composed of 10% previous populations filters selected by the "survival of the fittest" stage, 40% are crossover products of filter sets evaluated in the previous iterations, 10% are mutations of filter sets from the previous iterations, and 40% are randomly generated filter sets.

This evolutionary optimization process is repeated until the best reconstruction performance remains constant across several iterations, or a predefined run time limit has been reached.

Experimental Results

In order to evaluate the performance of the disclosed methodology, there was performed an evolutionary optimization of 3 filter sets over the following filter spaces:

A set of 21 filters provided by Midopt.

A set of 84 commercial camera filters measured by J. Jiang, D. Liu, J. Gu, and S. Susstrunk, *what is the space of spectral sensitivity functions for digital color cameras?* In Applications of Computer Vision (WACV), 2013 IEEE Workshop on, pages 168-179, IEEE, 2013.

A set of 1022 filters provided by OMEGA Optical, Inc.

It will be appreciated that these spaces contain 1330, 95284, and $1.77 \times 10^8$ possible 3-filter combinations, respectively. The training set in each experiment comprised of 106 pixels randomly selected from 51 HS training images (20,000 pixels per image). To further reduce computational cost, the test set comprised of the $2.5 \times 10^6$ random pixel sample described above.

Midopt Filter Space

In order to explore alternatives to consumer cameras, as well as the convergence of the evolutionary optimization method disclosed herein, a small scale experiment was performed over the Midopt filter space. the Midopt filter collection contains 21 band-pass and "color correction" filters that result in a relatively small 3-count filter space of 1,330 possible combinations. An individual evaluation of each combination was performed, resulting in the RRMSE performance depicted in FIG. 11A. Similarly, to the results over 28 consumer cameras described in FIG. 10, there is a significant performance gap between the best and worst performing filter sets. Additionally, the best performing filter set provides an average RRMSE of 0.116, an improvement over consumer cameras (best RRMSE=0.127).

Hence, it may be concluded that even a small, generic filter set may provide an advantage relative to consumer camera RGB filters. Although the Midopt filter set may be too small in order to enjoy significant performance gains via evolutionary optimization, there was examined the convergence of the latter by performing 50 repetitions of evolutionary optimization with a population size of 100. On average, optimization converged to the optimal filter set (RRMSE 0.116) within 9.14 iterations, after examining 499 distinct filters (less than 38% of the entire filter space). FIG. 11B depicts the optimal filter set found within the Midopt filter space. Finally, in order to further verify the representation power of the random pixels subset used during evolutionary optimization, RRMSE values of the top-performing filter set was recomputed over all test images ($9.2 \times 10^7$ hyperspectral pixels), producing the result of RRMSE=0.116 yet again.

Commercial Camera Filter Space

Exploring combinations of band-pass and "color correction" filters provided a significant advantage in HS reconstruction accuracy over existing camera designs. Rather than forgo RGB-like filters completely, it may be beneficial to examine alternative combinations of existing RGB filters from consumer cameras. Therefore, there was considered the filter space defined by all 84 consumer camera filters measured by Jiang et al. (id.) (28 cameras, three filters per camera). These filters span a filter space of size 95,284 possible combinations over which both exhaustive evaluation and evolutionary optimization were performed.

FIG. 11C depicts the RRMSE of HS reconstruction per filter set. The optimal filter set, shown in FIG. 11D, included the blue filter from a Canon 5DMarkII, the green filter from a Nikon D40, and the red filter from a Hasselblad H2. Combined as a filter set, they provided a RRMSE of 0.119, an improvement over each individual camera (Canon 5DMarkII, RRMSE 0.133; Nikon D40 RRMSE 0.149; and Hasselblad H2 0.154) as well as over the highest performing consumer camera (Nikon D5100, RRMSE 0.127). While exhaustive evaluation of 95,284 filter sets was required in order to find the globally optimal filter set, evolutionary optimization provided a significantly faster convergence. With a population size of 300, a near optimal filter set (RRMSE 0.120) was found within 4 generations. The globally optimal filter set (RRMSE 0.119) was located after 46 generations, requiring the evaluation of fewer than 13,800 filter sets, making up less than 15% of the entire filter space, and, by extension, representing less than 15% of the effort extended in the exhaustive search. Repeated experiments with the same parameters (50 repetitions) show that the optimal filter set is found, on average, after 34.8 iterations, examining 8,232 distinct filter set combinations (less than 9% of the entire filter space).

OMEGA Optical, Inc. Filter Space

Previous experiments not only demonstrated the utility of non-RGB-like filters in HS reconstruction, but also the efficient convergence of evolutionary optimization over large filter spaces. Therefore, a final experiment was performed on a large and highly varied filter space, spanning 1,022 assorted optical filters, and resulting in 177,388,540 possible filter combinations. Since exhaustive evaluation of the entire OMEGA Optical filter space would take many processor-years, only evolutionary optimization and random search were performed. Using a population size of 300, three evolutionary optimizations were repeated, each with a maximal runtime of 50 generations, which together evaluated a total of 39,595 filter set combinations and produced a filter set with a RRMSE of 0.107. The convergence was very fast and obtained a filter set with RRMSE=0.109 after only 4,031 evaluations, while the final gain of 0.002 in RRMSE was obtained during the rest of the evolutionary optimization process. Perhaps not surprisingly given the size of the filter set, this result outperforms the best sets obtained from the smaller Midopt and commercial camera filter sets.

To obtain some measure of performance gain over exhaustive search, should one have been performed, there was carried out a random search by repeatedly sampling the filter space for sets of size 3 and evaluating their merit for HS reconstruction. It took 344,600 filter evaluations, an order of magnitude more than the evolutionary optimization, to first encounter a filter set combination with RRMSE=0.107, and this result never improved until the search was stopped at 450,000 filter set evaluations.

Figure 12B:
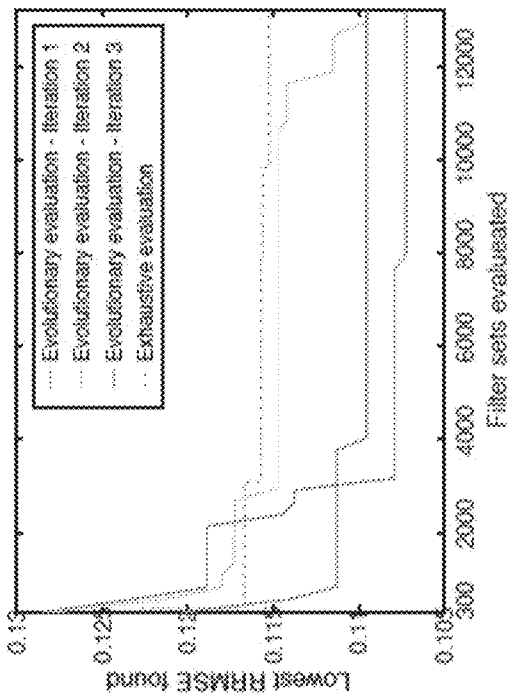
FIGS. 12A-12C show experimental results of testing of a method for selecting a color filter array for a digital camera, in accordance with an embodiment.
Figure 12C:
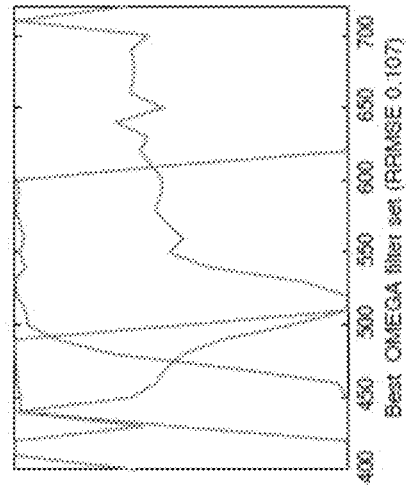
Figure 12A:
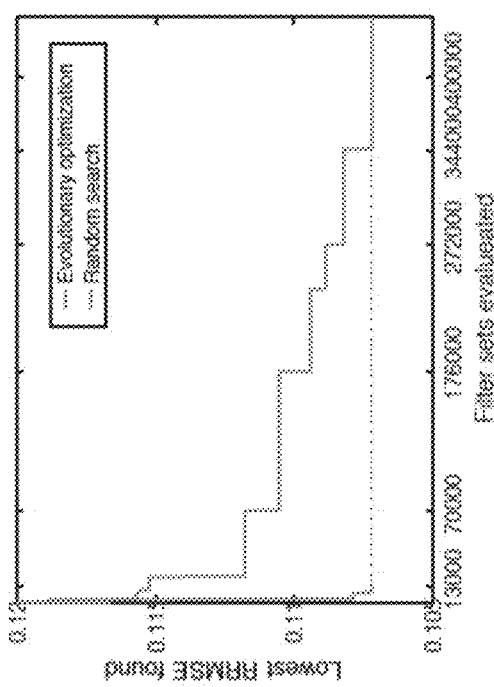

FIGS. 12A and 12B present convergence rates of both processes, and FIG. 12C depicts the optimal filter set found within the OMEGA filter space. Re-computing the RRMSE values of the top performing filter set over all test images ($9.2 \times 10^7$ hyperspectral pixels) produced identical RRMSE values. In FIG. 12A, it can be appreciated how quickly the optimization methodology converged with the exhaustive search. In FIG. 12B, it can be appreciated that all evolutionary optimization attempts converged to RRMSE 0.109 within at most 12,920 filter evaluations, while exhaustive evaluation required more than 175,900 individual evaluation to reach the same result, and more than 238,700 evaluations to improve upon it.

By exploring various filter spaces, it was found that hyperspectral estimation errors can be reduced at least 20.6% by simply selecting an optimal consumer camera (e.g., Olympus E-PL2 vs. Nikon D5100). If custom filter sets are considered, estimation errors can be reduced at least 33.1% (e.g., Olympus E-PL2 vs. optimal filter set found in OMEGA filter space). Expanding the scope of these filter-spaces may present even additional gains.

Figure 13:
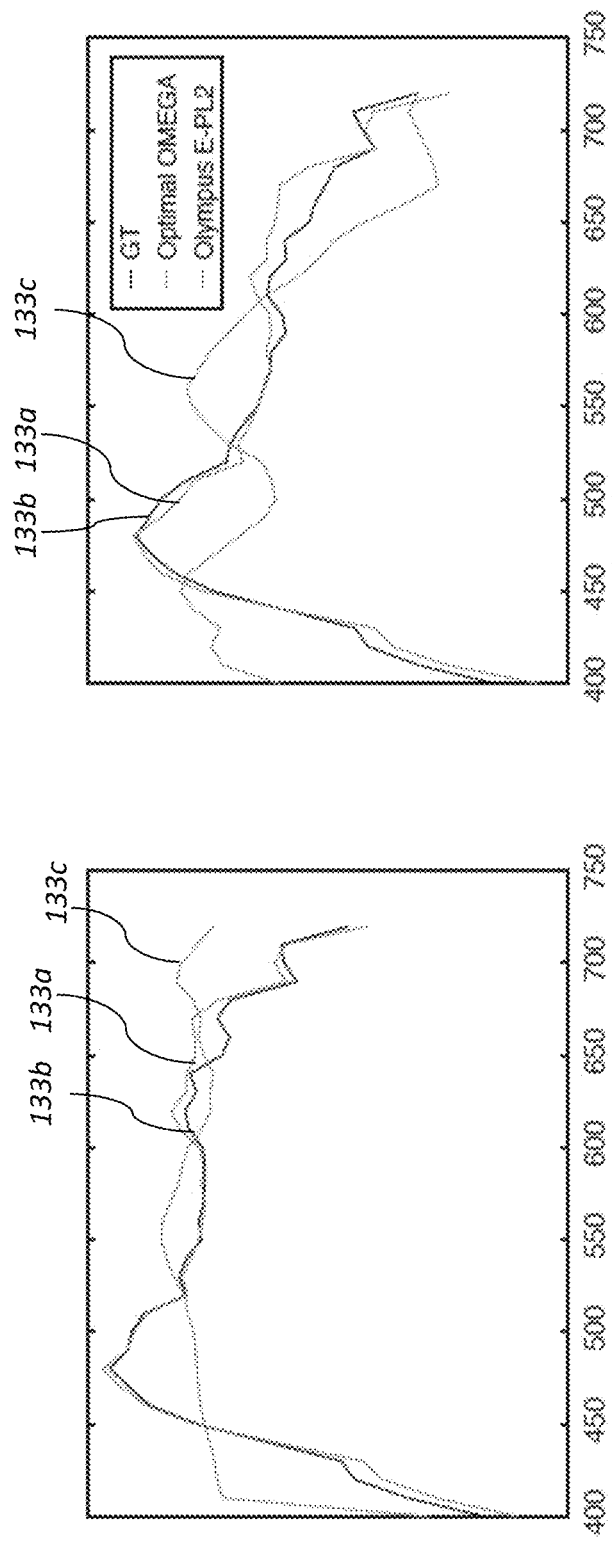
FIG. 13 illustrates the performance gap between hyperspectral reconstruction using consumer camera filter sets and optimized filter sets, in accordance with an embodiment.

FIG. 13 demonstrates the performance gap between reconstruction using consumer camera filter sets and optimized filter sets. HS data reconstructed using the optimal OMEGA filter set represented by lines 133a in the graphs, matches closely ground-truth spectra from the test pixel subset represented by lines 133b. At the same time, HS data reconstructed using the Olympus E-PL2 filter set, represented by lines 133c, does not match the test data.

In a field where "state of the art" methods often compete for single percentage point advantages, such performance improvements are significant. Furthermore, it will be appreciated that the present method amply demonstrated that evolutionary optimization can select optimal or near-optimal filter sets from large filter spaces, while exploring only a small fraction of the filter space and a small sample of the test data.

The experiments described above found filter selection to significantly impact performance of two HS reconstruction systems based on different methodologies. Accordingly, there is reason to believe that future HS-from-RGB systems, or even current hybrid RGB-HS systems, can be similarly affected. The design of any such system should therefore take filter selection into account and may employ the disclosed methodology for optimizing this process.

Compressed Sensing RGB Camera

Disclosed herein is a camera system comprising an optimized CFA for producing full-scene hyperspectral data and for improved quantum efficiency.

Further disclosed is a method for generating a full RGB color image from the hyperspectral data produced by said camera system.

As noted above, the quantum efficiency or photon efficiency of an image sensor is defined as the percentage of photons hitting the device's photoreactive surface that produce charge carriers. In a nutshell—an image sensor with a high photon efficiency is more sensitive to light. In image sensor design, increasing photon efficiency is beneficial, as it increases the sensors capability to function in low-light conditions.

The photon efficiency of an image sensor can be increased through several avenues including, but not limited to: increasing the size of the sensors photon-sensitive area ("pixel size"), improving the performance of the photon sensing area, and modification of the optical pathway to the sensor. While the former two methods usually carry a significant design and production cost to implement, the latter may come at the expense of optical quality in either image sharpness or color correction.

It would be desirable to improve the photon efficiency of an existing sensor design without significant modification of the manufacturing process, or adversely affecting the optical quality of the images it produces. Reference is also made to the discussion of current CFA technology under "Current Color Filter Arrays in Digital Cameras" above.

As noted elsewhere herein, the majority of existing RGB image sensor either measure light intensity over the red, green, and blue channels directly (Bayer CFA) or attempt to estimate their values via extrapolation (e.g., BriteCell CFA). The disclosed method provides an indirect measurement of these values via compressed sensing. Rather than recording intensity over a wide-band RGB filter, the disclosed method aims to recover the entire spectral distribution of light arriving at the sensor. Once this distribution is known, values of the RGB channels can be easily computed therefrom.

To achieve the above, there is first selected an optimal set of filters for constructing a CFA for both improved quantum efficiency and increased hyperspectral (HS) reconstruction accuracy. The optimal set of filters may be selected using the method disclosed hereinabove under "Selection of Optimized Color Filter Array." The optimal filter set may, for example, have color response profiles as illustrated in the graph in FIG. 8A.

Figure 14:
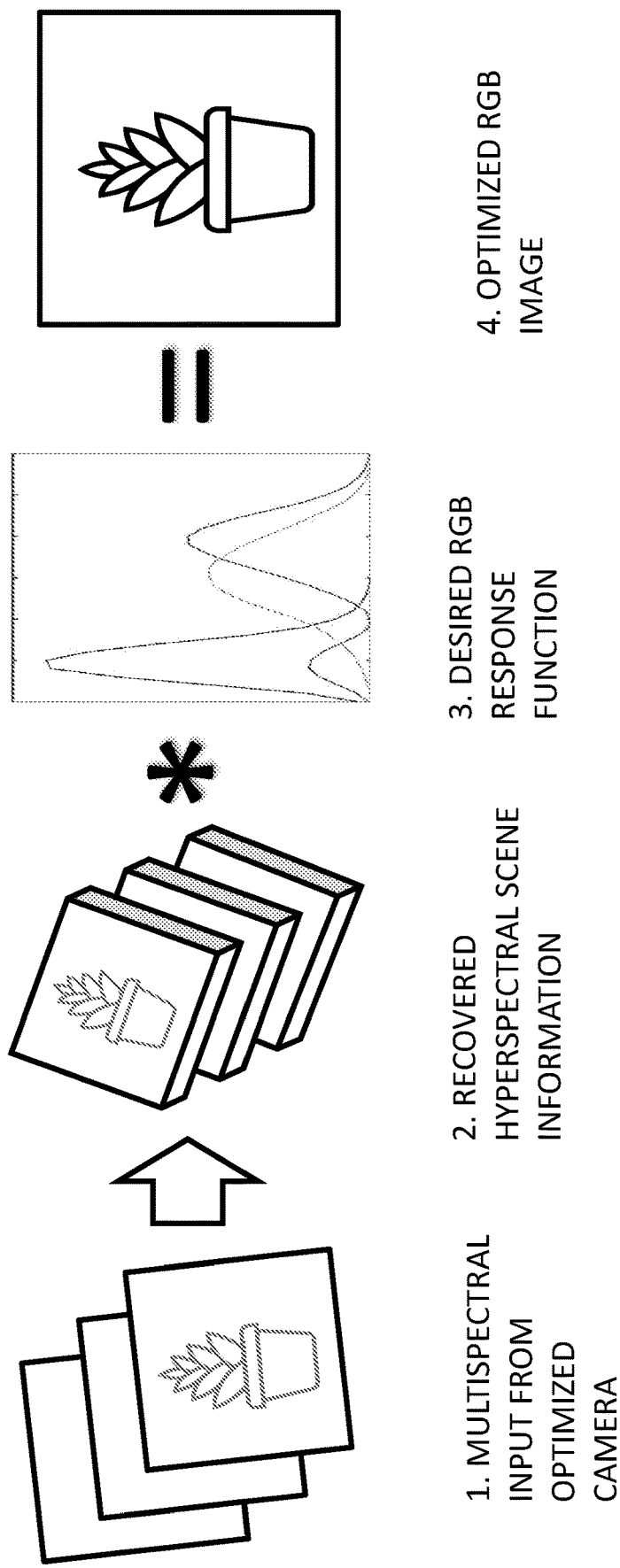
FIG. 14 is a schematic illustration of a method for generating RGB data from reconstructed spectral data, in accordance with an embodiment.

As illustrated in FIG. 14, after a filter set has been selected, a CFA is constructed using the selected filter set components. The constructed CFA may be applied to an image sensor of a camera, which may be used in a step 1 for capturing an image having multispectral data. In a step 2, full-scene HS information may be recovered from said image by the method first outlined hereinabove under "Recovery of Hyperspectral Data from RGB Images." RGB data may then be generated from said HS data in a step 3 by applying a desired RGB response function to the HS data, to receive in a step 4 an optimized RGB image. The result is a highly quantum-efficient and color-accurate camera system which does not suffer from increased spatial artifacts affecting traditional Bayer sensors.

Figure 15A:
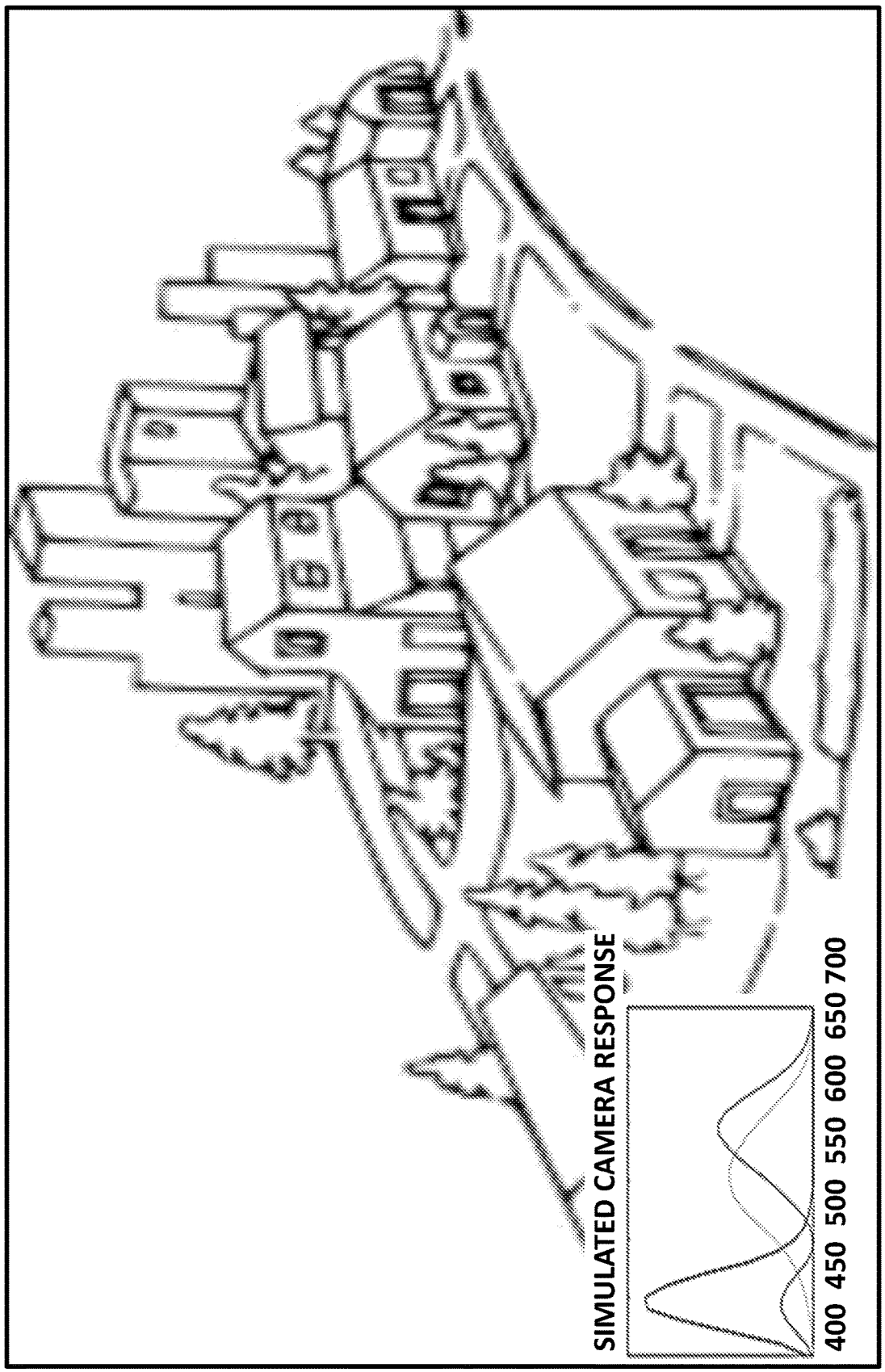
FIGS. 15A-15B show, respectively, a sample scene as viewed by the simulated RGB camera, as well as reconstructed by the optimized camera system, in accordance with an embodiment.
Figure 15B:
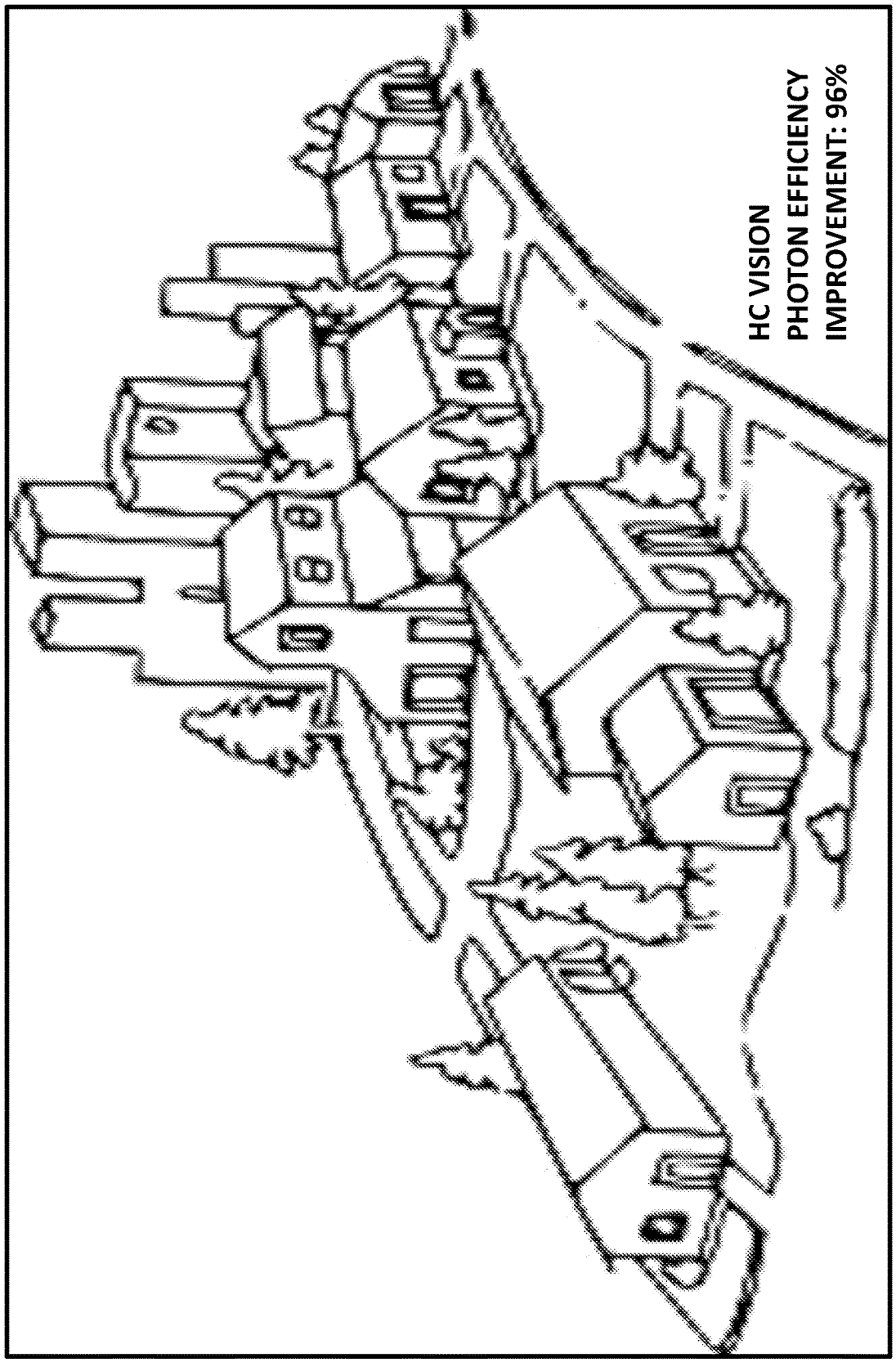

In order to evaluate the photon efficiency gains of the disclosed camera system against a commercially-available camera, the following experiment was performed: hyperspectral images from a hyperspectral image database were used to produce simulated camera responses for both the optimized filter-set found by using the present method, and an RGB camera (simulated using the CIE 1964 color matching function). In both cases camera responses were normalized to range from 0 to 1, and sensor quantum efficiency was estimated based upon average scene luminance across all channels. Over all scenes examined, the optimized CFA exhibited quantum efficiency that was 104% higher, on average, than that of the consumer-grade RGB camera. FIGS. 15A and 15B show (in monochrome), respectively, a sample scene as viewed by the simulated RGB camera, as well as reconstructed by the optimized camera system. As is evident from the images, the image of FIG. 15B resulting from the optimized camera system exhibits a 96% increase in quantum efficiency and no noticeable color/spatial artifacts.

The camera system of the present disclosure may be implemented by employing such optimized CFA by fabrication and installation of a customized CFA according to the disclosed method, to be overlaid on a CMOS or a CCD sensor. Alternatively, the camera of the present disclosure may not include any customized CFA, or may include one or more CFAs of various types. The camera may be an RGB camera, or any other multispectral camera.

The optimized CFA discussed above uses 4 color channels, however, a camera system of the present disclosure may use fewer (e.g., 3) or more (5+) color channels. Although the above discussion focuses on a Bayer-filter implementation, the present system can be implemented in other configurations, such as a 3-CCD-like beam-splitter based configuration.

Although the above discussion uses the HS recovery method described hereinabove under "Recovery of Hyperspectral Data from RGB Images," this method may be substituted by some other HS recovery method, or even completely supplanted by pre-computing the results of HS reconstruction and the corresponding RGB values, thus creating a camera system with the same capabilities that does not explicitly go through the intermediate step of HS data reconstruction.

Implementation Considerations

Although the experiments described above employed the methodology for HS reconstruction disclosed hereinabove, this approach may impose increased computational demands on low-cost consumer hardware. To avoid this outcome, in some embodiments, precomputation of results or estimation via machine-learning may be employed, as described below.

In a precomputation configuration to be employed in certain embodiments, the HS reconstruction and RGB projection process is replaced either partially or entirely by a lookup table or similar data-structure. Since the space of possible sensor responses is known (e.g., $255^4$ possible values for a single pixel in an 8-bit sensor with a 4-filter array), the corresponding HS value and/or RGB projection for each input may be precomputed and stored. For stored values, the computationally intensive reconstruction and projection procedure is replaced by a computationally facilitated lookup operation.

In addition, although the precomputation approach described above can significantly reduce the computational power needed to implement the camera system, a full lookup table can often require large amount of data storage (several giga-bytes or more). Although this space requirement could be offset by combining a partial lookup table with on-demand computation, scenes which are poorly covered by the lookup table may require extensive computations. In some embodiments, this space/computation trade-off can be offset via machine learning. First, a full precomputed lookup table is generated for the target sensor. Once the table is computed, machine learning techniques, such as deep neural networks, can be applied to learn the mapping between camera input and desired HS/RGB output. While this approach may incur some penalties in accuracy, it will produce a compact and computationally-efficient representation of the mapping between sensor input and the desired output.

Several Applications of the Present System

Hyperspectral Sensing

The HS information produced in step 2 of the imaging process (see FIG. 14) can be used directly for a variety of applications, such as material analysis, wherein spectral signatures can be used to differentiate between materials that would appear identical to an RGB camera. Hyperspectral information can also be used as additional input to improve existing object recognition systems.

RGB or Multispectral Camera Simulation

The HS information acquired by the disclosed camera allows generating RGB or other multispectral outputs therefrom, even if the filters selected differ greatly from conventional RGB or any other given set of multispectral camera filters. By applying RGB (or other multispectral) response functions to the reconstructed HS information, conventional RGB or other desired multispectral images may be produced.

Not only can RGB or multispectral information be produced, but the color response of various cameras may be reproduced by the very same camera of the present disclosure by applying appropriate response curves. Response curves may be further manipulated for artistic effect.

Photographic Filter Simulation

Although photo editing software provides increasingly complex options for photo manipulation, many professional photographers continue to use physical, camera-mounted filters, in order to produce various color effects. This use of physical photographic filters persists, be because software-based simulations are difficult to perform in the absence of spectral information. By accurately recovering HS information, the present camera system allows precise simulation of photographic filters in post-processing.

Increased Photon Efficiency

Conventional RGB filters have the often-overlooked but significant drawback of reducing sensor light sensitivity by approximately 66%, as each filter covers approximately one third of the visual spectrum, and perhaps even less with respect to the camera sensor response range, which may extend from 400 to 1000 nanometers (nm). The same limitation, at various degrees of light deficiency, is present is all multispectral cameras, leading to significantly inferior performance at non-optimal acquisition conditions (e.g., dim light, night photography, extremely short exposure times, etc.)

Since the present disclosed camera system may produce accurate RGB or other multispectral images with non-RGB filters, an additional constraint may be introduced to the procedure described to optimize filter selection while maximizing filter response in a given spectral range or the amount of light penetrating the sensor in a given part (or all) of its sensitive range. Camera photon efficiency may thus be increased by 100% or more, with little loss of accuracy.

Consistent Exposure of All Pixels Across Various Illumination Conditions, and Advantages Over RGB-C Increasing sensor sensitivity by removing RGB filters or expanding their range has traditionally been achieved by either duel-camera systems, or RGB-C/RGB-W Bayer configurations, as discussed above. Duel camera systems utilize a B/W (monochrome) camera in conjunction with an RGB camera, using the first to record luminance information, while the second records color information. RGB-C/RGB-W systems (also known as RGB-Clear or RGB-White) utilize a single sensor with a Bayer filter in which some or all of the 'green' pixels are replaced by an unfiltered or "clear" pixel. This "clear" pixel enjoys greatly increased photon efficiency and can be used to record luminance information in low-light settings.

Duel-camera systems have the drawback of requiring a second camera, along with the parallax errors that it produces. The main drawback of RGB-C systems is that it is not always possible to correctly expose all pixels simultaneously. In high illumination environments, the "clear" pixels must be over-exposed in order to facilitate correct exposure of the RGB pixels. This results in the loss of up to 25% of the scenes spatial information, according to some sources.

In the present system, removal of the RGB-like filter constraint allows the selection of highly photon-efficient filters without introducing a disparity between pixel illumination levels. This allows consistent exposure of all pixels across various illumination conditions, effectively combining the dynamic range of a duel-camera system with the single-sensor advantage of RGB-C systems. And with all filters optimized, the total amount of light allowed into the sensor is still considerably larger than RGB-C designs.

Illumination Correction

Despite years of research, illumination correction (or "white balance") in consumer cameras remains on open problem. Current generation cameras often fail in matching the human-level color constancy, especially in challenging lighting conditions. While HS systems face similar challenges, the problem of illumination estimation becomes significantly simpler when HS information is available.

Using the present camera system, illumination estimation and correction may be performed in HS space. The resulting corrected HS information may be used to produce RGB images or for other HS applications (see "RGB or Multispectral Camera Simulation" above).

Relighting
   Once illumination and reflectance are separated (see "Illumination Correction" above), alternative illumination may be applied to scene reflectance, resulting in a relighted image.

Spectral High-Dynamic-Range (HDR) Imaging
   HDR imaging attempts to overcome limitations in both camera sensors and digital displays, simulating the capture and display of a wider range of luminance values than that the camera sensor or screen can record/display. This is performed by capturing two (or more) images, each at a different exposure setting, and fusing them together by suitable algorithms.
   In the present camera system, HS information from a single image may be processed and projected to RGB in order to simulate the display of a wider range of tones than RGB can produce. This can be used either to emphasize important spectral information in a scientific/industrial setting, or for a visually pleasing effect.

Material Sensing
   HS information may allow per-pixel material identification by identifying the spectral signatures of various materials and their combinations.
   While there are many existing industrial applications of this technology, possible uses in a consumer setting include: food analysis/safety, plant care (water/nutrient content), and more.

Object Recognition
   While HS information can facilitate pixel-level material identification, it may also serve as an additional source of features for existing object recognition pipeline.
   HS information has already been shown to improve facial recognition and other complex object recognition tasks. See, for example, M. Uzair, A. Mahmood, A. Mian, "Hyperspectral Face Recognition with Spatiospectral Information Fusion and PLS Regression", *IEEE Transactions on Image Processing*, Vol. 24, Issue 3, March 2015.

The present inventions may be embodied as system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

What is claimed is:

1. A method for approximating spectral data, the method comprising using at least one hardware processor for:
   providing a digital image comprising data in a first set of spectral bands;
   providing an overcomplete dictionary comprising (a) signatures in a second set of spectral bands and (b) values in said first set of spectral bands, wherein said values correspond to the signatures, and wherein said signatures sparsely represent signals associated with said second set of spectral bands; and
   approximating, based on the overcomplete dictionary, data in said second set of spectral bands of for each pixel in said digital image,
   wherein said approximating comprises matching each of said pixels to a set of said values, based, at least in part, on:
   (i) determining a weight of each of said values in said set,
   (ii) calculating a weighted sum of said values in said set,
   (iii) selecting a corresponding set of said signatures, wherein each signature in said corresponding set corresponds to one of said values in said set, and
   (iv) applying said weights to said signatures in said corresponding set to calculate a weighted sum of said signatures in said corresponding set.

2. The method of claim 1, wherein said first set of spectral bands is red-green-blue (RGB), and said second set of spectral bands comprises a larger number of spectral bands than said first set.

3. The method of claim 1, wherein each band of said first set of spectral bands has a width of 5 to 100 nanometers.

4. The method of claim 1, wherein each band of said second set of spectral bands has a width of 5 to 100 nanometers.

5. The method of claim 1, further comprising constructing the overcomplete dictionary based on a set of representative multispectral images each comprising data in said first set of spectral bands and in said second set of spectral bands.

6. An apparatus comprising:
   an image sensor configured to capture a digital image in a first set of spectral bands;
   a non-transient memory having stored thereon an overcomplete dictionary comprising (a) signatures in a second set of spectral bands and (b) values in said first set of spectral bands, wherein said values correspond to the signatures, and wherein said signatures sparsely represent signals associated with said second set of spectral bands; and
   at least one hardware processor configured to approximate, based on the overcomplete dictionary, data in said second set of spectral bands of for each pixel in said digital image,
   wherein said approximating comprises matching each of said pixels to a set of said values, based, at least in part, on:
   (i) determining a weight of each of said values in said set,
   (ii) calculating a weighted sum of said values in said set,
   (iii) selecting a corresponding set of said signatures, wherein each signature in said corresponding set corresponds to one of said values in said set, and
   (iv) applying said weights to said signatures in said corresponding set to calculate a weighted sum of said signatures in said corresponding set.

7. The apparatus of claim 6, wherein said first set of spectral bands is red-green-blue (RGB), and said second set of spectral bands comprises a larger number of spectral bands than said first set of spectral bands.

8. The apparatus of claim 6, wherein each band of said first set of spectral bands has a width of 5 to 100 nanometers.

9. The apparatus of claim 6, wherein each band of said second set of spectral bands has a width of 5 to 100 nanometers.

10. The apparatus of claim 6, wherein said dictionary comprises an overcomplete dictionary is constructed based on a set of representative images, each comprising data in said first set of spectral bands and in said second set of spectral bands.

11. The method of claim 1, wherein said matching is further based, at least in part, on a matching pursuit algorithm.

12. The apparatus of claim 6, wherein said matching is further based, at least in part, on a matching pursuit algorithm.

* * * * *